United States Patent [19]
Yoshizawa et al.

[11] Patent Number: 5,359,548
[45] Date of Patent: Oct. 25, 1994

[54] FLOATING-POINT ARITHMETIC SYSTEM HAVING MULTIPLE-INPUT ADDITION AND SUBTRACTION MEANS

[75] Inventors: Hideki Yoshizawa; Katsuhito Fujimoto; Tatsushi Otsuka, all of Kawasaki, Japan

[73] Assignee: Fujitsu Limited, Kawasaki, Japan

[21] Appl. No.: 45,766

[22] Filed: Apr. 14, 1993

[30] Foreign Application Priority Data

Apr. 15, 1992 [JP] Japan .................. 4-095028

[51] Int. Cl.$^5$ .............................. G06F 7/38
[52] U.S. Cl. .................................. 364/748
[58] Field of Search ............. 364/748, 736, 754, 757, 364/784, 786, 715.06

[56] References Cited

U.S. PATENT DOCUMENTS

| | | | |
|---|---|---|---|
| 4,748,580 | 5/1988 | Ashton et al. | 364/748 X |
| 4,876,660 | 10/1989 | Owen et al. | 364/754 |
| 4,918,636 | 4/1990 | Iwata et al. | 364/715.06 |
| 4,928,259 | 5/1990 | Galbi et al. | 364/757 |
| 5,161,119 | 11/1992 | Chang et al. | 364/786 |

*Primary Examiner*—Tan V. Mai
*Attorney, Agent, or Firm*—Nikaido, Marmelstein, Murray & Oram

[57] ABSTRACT

A floating-point arithmetic system, which allows arithmetic operations, including at least addition and subtraction, to be performed for floating-point data. The system includes multiple-input addition and subtraction devices for executing adding and subtracting calculations of at least three floating-point data. Preferably, the multiple-input addition and subtraction devices includes a multiple-input device which enables at least three floating-point data to be input, a shift-amount determining device having a look up table which compares the respective exponents in parallel, selects the maximum exponent and determines the amount of shift in the respective mantissas; and a mantissa shifting devices, e.g., at least one multiplexer, which shifts the respective mantissas in accordance with the amount of shift and makes an adjustment of digit positions of the mantissas. The system also includes at least one multiple-input adder-subtractor which executes addition and subtraction for the mantissas output from the mantissa shifting device, and a normalization circuit which normalizes a result obtained by the multiple-input adder-subtractor.

12 Claims, 24 Drawing Sheets

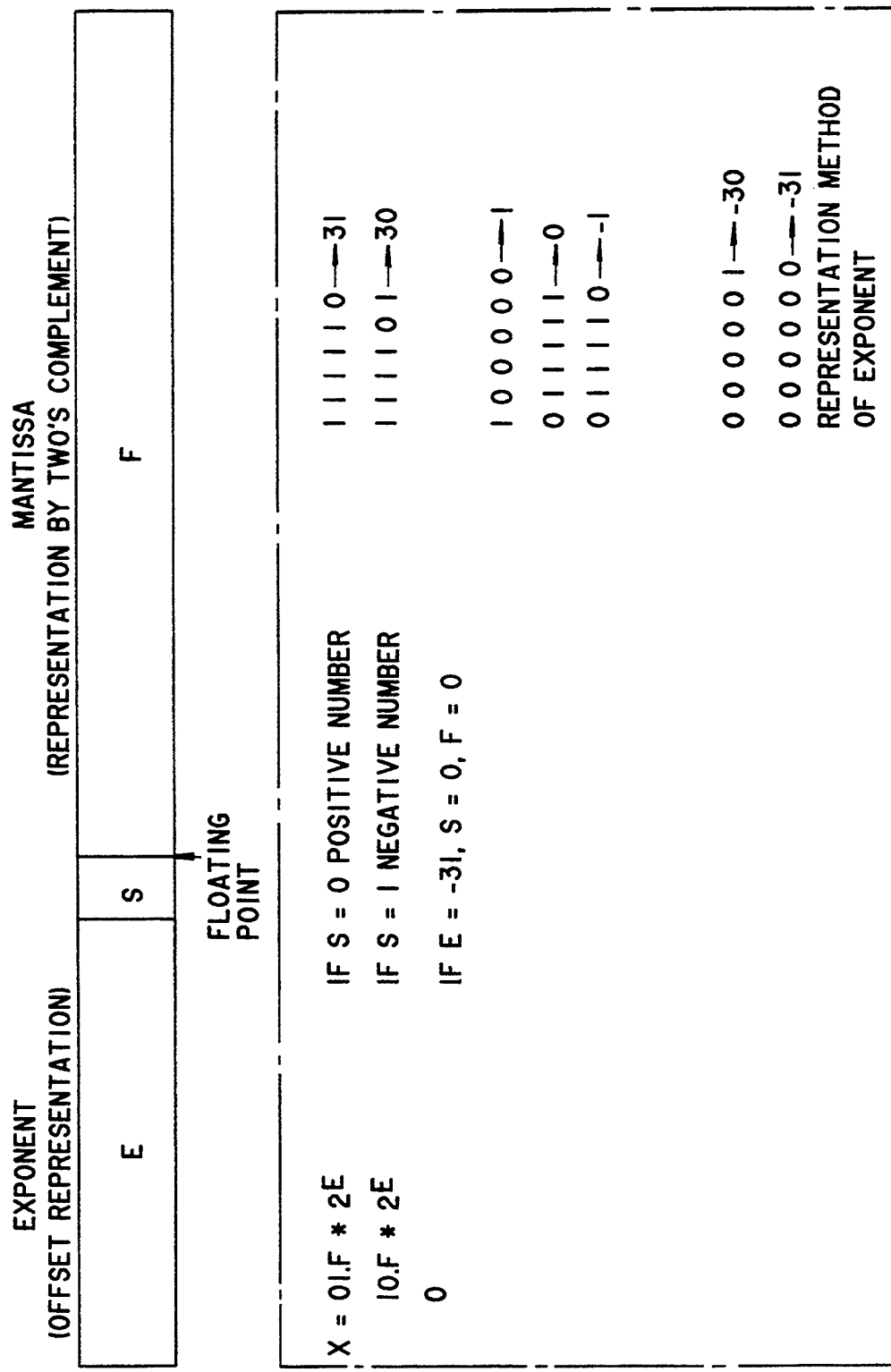

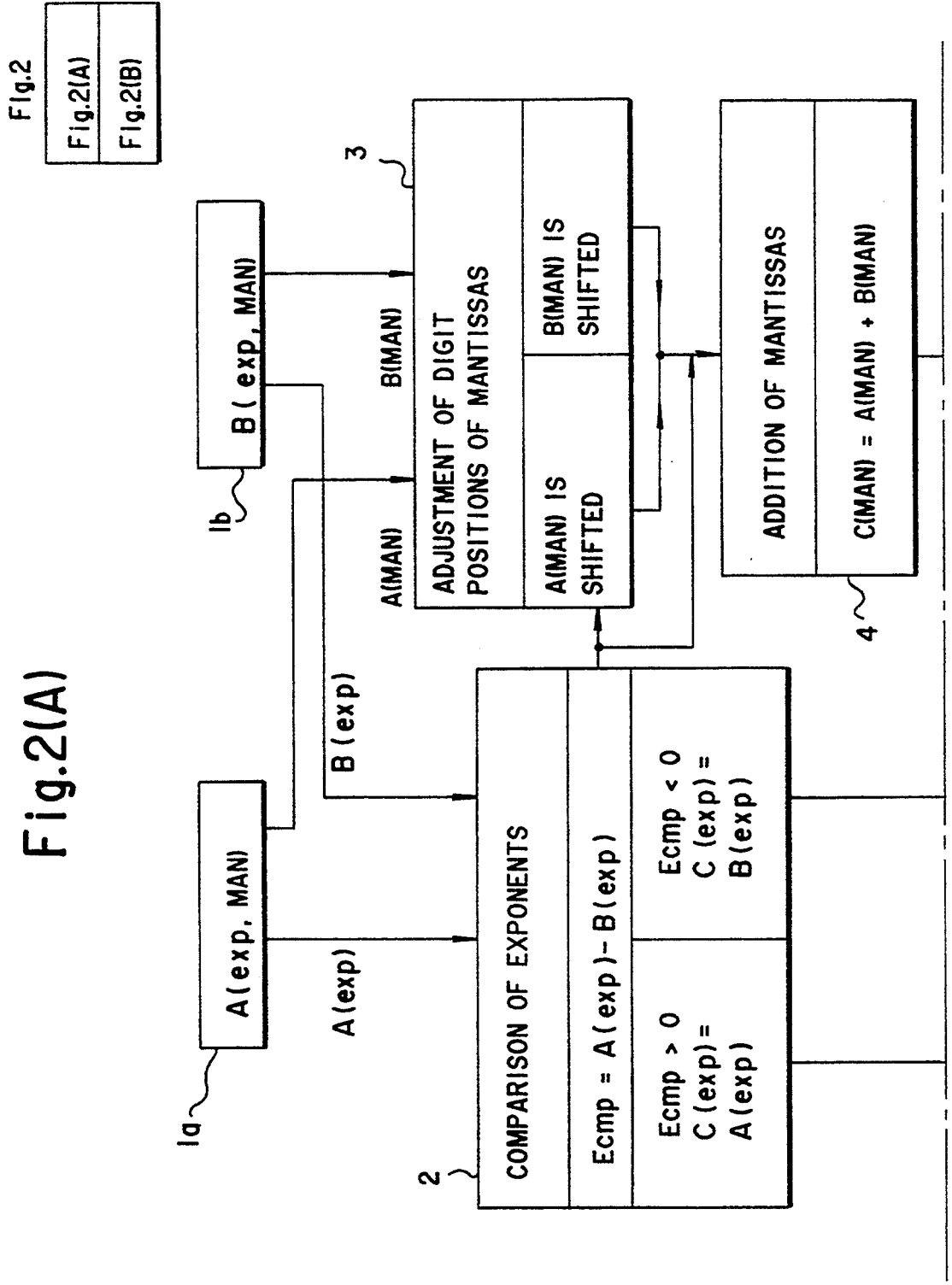

(I)
$$01.100000000000000000 \times 2^{15}$$
$$+\ 01.000000000000000000 \times 2^{14}$$

⇩

$$01.100000000000000000 \times 2^{15}$$
$$+\ 00.100000000000000000 \times 2^{15}$$
$$\overline{010.000000000000000000 \times 2^{15}}$$

⇩

$$01.000000000000000000 \times 2^{18}$$

(II)
$$01.000000000000000000 \times 2^{19}$$
$$+\ 10.000000000000000000 \times 2^{0}$$

⇩

$$01.000000000000000000 \times 2^{19}$$
$$+\ 11.111111111111111111 \times 2^{19}$$
$$\overline{000.111111111111111111 \times 2^{18}}$$

⇩

$$01.111111111111111111 \times 2^{18}$$

(III)
$$01.111111111111111111 \times 2^{-20}$$
$$-\ 01.111111111111111111 \times 2^{-20}$$
$$\overline{00.000000000000000010 \times 2^{-20}}$$

⇩

$$01.000000000000000000 \times 2^{-37}$$

⇩ UNDERFLOW $$00.000000000000000000 \times 2^{-31}$$

$1.50 \times 2^{15}$
$+\ 1.00 \times 2^{14}$

⇩

$1.50 \times 2^{15}$
$+\ 0.50 \times 2^{15}$
$\overline{2.00 \times 2^{15}}$

⇩

$1.00 \times 2^{18}$ $1.00 \times 2^{19}$
$+\ -2.00 \times 2^{0}$

⇩

$1.00 \times 2^{19}$
$+\ -2.0^{-18} \times 2^{19}$
$\overline{(1 - 2^{-18}) \times 2^{18}}$

⇩

$(2 - 2^{-17}) \times 2^{18}$ $(2 - 2^{-17}) \times 2^{-20}$
$-(2 - 2^{18}) \times 2^{-20}$
$\overline{2.0^{-17} \times 2^{-20}}$

⇩

$1.00 \times 2^{-37}$

Fig.8
THE CASE WHERE
$$Z(k) = \underbrace{W2 * X2 + \overbrace{W * X1 + Y(k)}^{NA}}_{NB}$$
IS EXECUTED
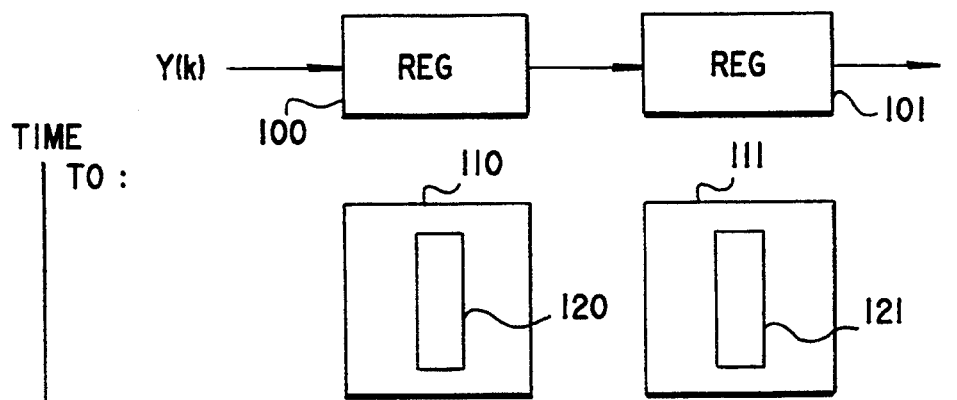
TIME
T0:
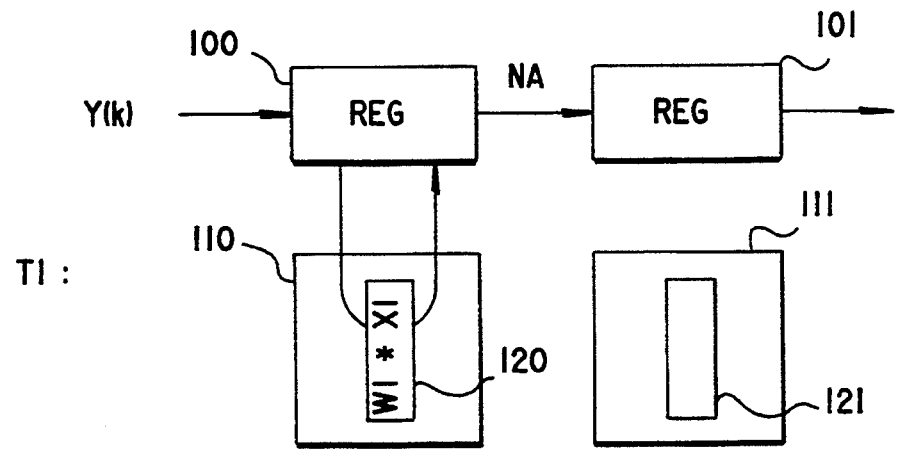
T1:
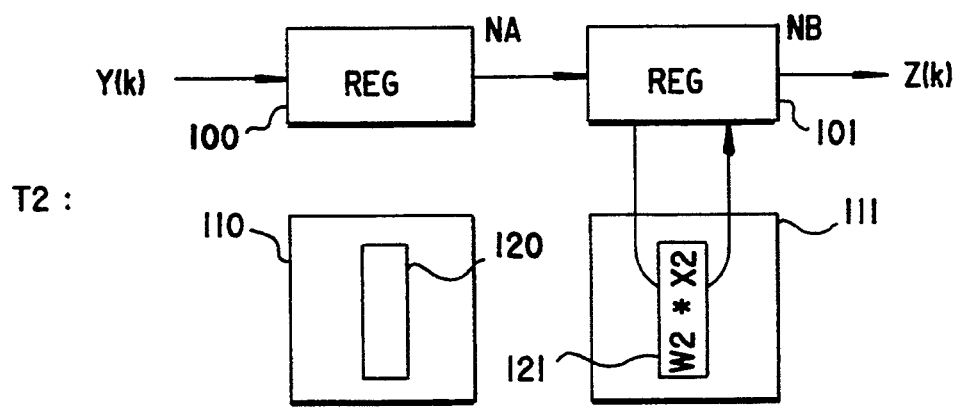
T2:

Z = X0 + X1 + Y

Z = X0 + X1 + Y $$Y(Z) = (W0 + W1 * Z^{-1} + W2 * Z^{-2}) D(Z)$$

$Y = W0*D0 + W1*D1 + W2*D2 + W3*D3 + W4*D4 + W5*D5 + W6*D6 + W7*D7$

FLOATING-POINT ARITHMETIC SYSTEM HAVING MULTIPLE-INPUT ADDITION AND SUBTRACTION MEANS

BACKGROUND OF THE INVENTION

1. Field of the Invention

The present invention relates to a floating-point arithmetic system for performing various arithmetic operations, including addition and subtraction calculations, on a lot of data, i.e., various kinds of numbers, which are represented in a floating-point format, where each of the numbers is represented as an exponent and a mantissa.

More specifically, the present invention relates to a floating-point arithmetic system which enables large amount of data to be processed at high speed by utilizing a floating-point format arithmetic means, which easily covers a wide range of numbers and which can be easily used by various kinds of measuring instruments, various kinds of digital circuits, and the like.

2. Description of the Related Art

With the recent progress of computer systems, the range of values of data (numbers), which can be handled in various kinds of measuring instruments, various kinds of digital circuits, and the like, tends to become wider and wider. To meet such a tendency, the arithmetic operations on numbers in the floating-point format (also referred to as floating-point data) which covers the wide range are likely to be generally used, rather than operations on data in the fixed-point representation.

Further, as the technical field, to which these arithmetic operations on data in the floating-point representation can be applied, is extended even toward a design of digital filter for processing digital signals or a design of spatial filter for image processing, the amount of data for which various arithmetic operations must be executed is likely to increase. Furthermore, it is also necessary for such arithmetic operations to be performed at relatively high speed, since these digital signals must be processed in a real-time operation by means of digital filters, etc. In other words, it has become necessary to provide a floating-point arithmetic system which is capable of rapidly processing large amounts of data (multiple-input data), in the floating-point representation, in a short time.

In a floating-point arithmetic system according to the prior art, a plurality of two-input-type floating-point adder-subtractors, in which only two kinds of floating-point data are allowed to be input and addition and subtraction calculations thereof are executed, are connected in cascade. Further, by adequately combining these two-input-type floating-point adder-subtractors and a plurality of multipliers and a plurality of dividers with each other, a floating-point arithmetic system in which multiple-input data can be sequentially processed at evey adder-subtractor is finally constructed.

In such a construction, to realize data processing at relatively high speed, it is necessary for the operating speed of each arithmetic unit, such as two-input-type floating-point adder-subtractors, multipliers and dividers, to be sufficiently high. Until now, with the progress of technology for fabricating an LSI (Large Scale Integrated Circuit), the improvement of operating speed of such two-input-type floating-point adder-subtractors, etc., has been performed relatively smoothly.

However, as described above, since arithmetic operations on data in the floating-point format have tended to be also applied to the field concerning a design of digital filter or a design of spatial filter for image processing, it is urgently required that larger amounts of data should be processed at very high speed. To satisfy such requirement, the amount of hardware must increase due to an increase in the number of the two-input-type floating-point adder-subtractors, and therefore the delay time caused by these floating-point adder-subtractors is not negligible.

Here, to clarify some problems regarding the prior art, the concrete construction of typical conventional floating-point arithmetic systems will be described with reference to the related drawings of FIGS. 1 to 9.

FIG. 1 is a diagram showing some examples in which data in the normalized floating-point representation are usually indicated; FIGS. 2(A) and 2(B) are flowcharts for each explaining the adding process of floating-point data according to the prior art; and FIG. 3 is a diagram showing some examples in which addition and subtraction calculations of floating-point data are executed by the process of FIGS. 2(A) and 2(B).

Typically, a value of floating-point data is indicated in a format as shown in FIG. 1. In FIG. 1, E denotes an exponent which is indicated in an offset representation. Namely, when a value of any exponent is indicated by means of six binary bits, "011111" denotes a zero ("0") that is a middle value, "000000" denotes "−31" that is a minimum value, and "111111" denotes "31" that is a maximum value. Further, S denotes a sign bit. If S=0, the sign bit represents a positive number, and if S=1, the sign bit represents a negative number. F denotes a mantissa which is indicated in two's complement representation.

The relationship between the respective actual values of X, F and E is represented as follows, by utilizing a normalization process.

A positive number X in the case where S=0 means that $X=01.F*2^E$, while a negative number X in the case where S=1 means that $X=10.F*2^E$. Further, if X is actually "0", the value of X is indicated as $E=-31$, S=0 and F=0.

In performing arithmetic operations for such floating-point data, according to the prior art, at least one arithmetic unit of the two-input-type, such as two-input-type floating-point adder-subtractor, is utilized. For example, an addition calculating by means of a two-input-type arithmetic unit is executed in accordance with the process of steps S1a to S9 (the following procedures ①-⑨) shown in FIGS. 2(A) and 2(B). Here, is should be noted that the subtracting process is also executed by the process similar to the adding process of steps S1a to S9. Further, it should be noted that the description of the case where only the adding process of only two floating-point numbers is executed will be made with reference to FIGS. 2(A) and 2(B), in order to simply the explanation of arithmetic operations.

Further, the adding process should be illustrated in one drawing of FIG. 2. However, in this case, since it is difficult for FIG. 2 to be contained in one sheet, FIG. 2 is divided into two drawings of FIGS. 2(A) and 2(B). FIG. 2(A) includes steps S1a to S4, while FIG. 2(B) includes steps S5 to S9.

① Steps S1a and S1b . . . two floating-point numbers on which an addition is to be executed are assumed to be A, B. Further, exponents of these values A, B are assumed to be A 9(exp), B(exp), respectively, while mantissas of these values A, B are assumed to be A(man), B(man), respectively.

②  Step S2 . . . an exponent of numbers B is subtracted from an exponent of numbers A. Further, a comparison of the magnitude of the exponents is made between the numbers A and B, and it is determined which exponent has larger value by discriminating whether a result of the above-mentioned subtraction $E_{cmp}$ becomes positive or negative. Consequently, the exponent having a larger value is defined as C(exp).

③  Step S3 . . . in accordance with the result of comparison in Step S2, digits of the mantissa corresponding to the exponent having a smaller value are shifted so that the digit positions of the above-mentioned mantissa can be adjusted to those of another mantissa corresponding to the exponent having a larger value.

④  Step S4 . . . after the adjustment process of the two mantissas in Step S3, the respective mantissas of the numbers A, B are added together. Further, a result of such an addition of these mantissas is defined as C(man) {=A(man)+B(man)}.

⑤  Step S5 . . . it is determined whether or not exception processing regarding the result of the addition of these mantissas C(man) in Step S4 is necessary. If the result of the addition of these mantissas C(man) becomes "0", or if it is unnecessary to execute the shift with respect to the result C(man) for normalization process, the addition process advances from S5 to Step S7, not via Steps S6a and S6b.

⑥  Steps S6a, S6b . . . if it is necessary to execute the right shift by 1 bit with respect to the result C(man) for normalization process, "1" is added to the exponent C(exp) defined in Step S2. On the contrary, if it is necessary to execute the left shift by n bit with respect to the result C(man) for normalization process, "n" is subtracted from the exponent C(exp) defined in Step S2.

⑦  Step S7 . . . it is determined whether or not exception processing regarding the exponent C(exp) calculated in Steps S2, S6a and S6b is necessary.

⑧  Step S8a . . . in the case where an underflow occurs in the exponent C(exp), or where a value of the exponent C(exp) becomes "0", all parts {C(man) and C(exp)} of the result of the two data A, B data are set at "0".

⑨  Step S8b . . . in the case where an overflow occurs in the exponent C(exp), if a value of the exponent C(exp) is a negative number, the result of the addition of the two numbers A, B is set at the most negative value. On the other hand, if a value of the exponent C(exp) is a positive number, the result of the addition thereof is set at the most positive value.

10  Step S9 . . . in the case where the result of the addition of the two numbers A and B has a normal value, this result is indicated as C (−A+B) represented by C(man) and C(exp).

(I), (II) and (III) of FIG. 3 show examples in which adding and subtracting calculations of floating-point numbers are executed by the process as described above. In FIG. 3, the left portion denotes several values in which each mantissa is represented in the binary notation. On the other hand, the right portion denotes the respectively corresponding values in which the above-mentioned mantissa is represented in the decimal notation.

In a first example of (I) of FIG. 3, in order to calculate $1.50 \times 2^{15} + 1.00 \times 2^{14}$, after the adjustment process of two mantissas has been performed based on $2^{15}$ where the exponent thereof has a larger value, the respective mantissas are added together. Further, a result of the addition $2.00 \times 2^{15}$ is normalized and an answer is finally obtained as $2^{16}$.

In a second example of (II) of FIG. 3, in order to calculate $1.00 \times 2^{19} + (-2.00 \times 2^0)$, after the adjustment process of two mantissas has been performed based on $2^{19}$ where the exponent thereof has a larger value, the respective mantissas are added together. Further, a result of the addition $(1-2^{-18}) \times 2^{19}$ is normalized and an answer is finally obtained as $(2-2^{-17}) \times 2^{18}$.

In a third example of (III) of FIG. 3, in order to calculate $(2-2^{-17}) \times 2^{-20} - (2-2^{-16}) \times 2^{-20}$, the respective mantissas are added together, and a result becomes $1.00 \times 2^{-37}$. In other words, this value $1.00 \times 2^{-37}$ means that an overflow occurs, and therefore all parts of the result are set at "0".

Further, some examples of the concrete construction of arithmetic systems using floating-point representation according to the prior art will be described, with reference to FIGS. 4 to 7.

FIG. 4 is a block diagram showing the construction of a first example of two-input-type floating-point adder-subtractors constituting the main part of a floating-point arithmetic system according to the prior art.

In FIG. 4, the construction of two-input-type floating-point adder-subtractors is illustrated in the case where addition and subtraction calculations of a large number of floating-point data (n kinds of floating-point data; n denotes an integer) are executed by utilizing a plurality of two-input-type floating-point adder-subtractors of the prior art. In this case, typically, a large number of two-input-type floating-point adder-subtractors 81-1, 81-2, . . . , 81-n are connected in cascade, for example, in a binary tree form (the number of whole stages is $\log_2 n$).

To be more specific, an addition and substraction calculation of data D0 and D1 is executed by an adder-subtractor 81-1. Further, an addition and substraction calculation of data D2 and D3 is executed by on adder-substractor 81-5. Further, an addition and substraction calculation of an output from the adder-subtractors 81-1 and an output from the adder-substractor 81-5 is executed by a adder-subtractors 81-2, and then an addition and substraction calculation of an output from the adder-subtractor 81-2 and an output from other adder-substractor is executed by an adder-subtractors 81-3. Further, addition and substraction calculations are executed in a similar manner repeatedly, so that accumulative addition and substraction calculations can be performed and a result of the calculations can be finally output from an adder-substractor 81-4.

FIG. 5 is a block diagram showing the construction of a second example (pipe-line type) of two-input-type floating-point adder-subtractors constituting the main part of a floating-point arithmetic system according to the prior art.

In FIG. 5, as often utilized in supercomputers, an arithmetic system of a pipe-line type is provided, in which the arithmetic operations are subdivided into a lot of process and each process is executed independently and sequentially, as if each process were a assembly line, in order to perform arithmetic operations at extremely high speed. To be more concrete, a two-input-type floating-point adder-subtractor 82, which is composed of a plurality of stages (k stages) divided in advance, is utilized. For example, in the case where accumulative addition and subtraction calculations regarding multiple-input data $x_1, x_2, \ldots,$ and $x_n$ are performed, the intermediate results, which are output from the two-input-type floating-point adder-subtractor 82, are returned to an input portion thereof, so that arithmetic operations of multiple-input data $x_1, x_2, \ldots,$ and $x_n$ are performed.

FIGS. 6 and 7 are block diagrams showing the constructions of first and second examples of multiplying and adding calculation (MAC) systems according to the prior art, including at least one floating-point adder-subtractor of the two-input-type.

In FIG. 6, a plurality of two-input-type floating-point adder-subtractors 91-6, 91-7 are connected in cascade. Further, by adequately combining these two-input-type floating-point adder-subtractors 91-6, 91-7, a plurality of multipliers 91-1, 91-3 and 91-5, and a plurality of delay units 91-2, 91-4, a multiplying and adding calculation system for executing an equation $Y(z)=(W0+W1*z^{-1}+W2*z^{-2}) D(z)$ can be constituted. This construction is a so-called multiplying and adding calculation system of an array type, in which an arithmetic calculation device is adapted to execute arithmetic operations of multiple-input data (three input data in FIG. 6) without a control by a program of computers by sequentially operating these two-input-type floating-point adder-subtractors as the main constituents.

On the other hand, in FIG. 7, a pipe-line register 92-4 is connected to an output terminal of a two-input-type floating-point adder-subtractor 92-3. Further, another pipe-line register 92-2 is connected to an output terminal of an multiplier 92-1, so that a multiplying and adding calculation system for executing the equation $Y(z)=(W0+W1*z^{-1}+W2*z^{-2}) D(z)$ same as that shown in FIG. 6 can be constructed. This construction is a so-called multiplying and adding calculation system of a pipe-line type. Also, in such a calculation system, arithmetic operations on multiple-input data are executed by utilizing software of a program of computers, by means of such a two-input-type floating-point adder-subtractor 92-3. Further, in FIG. 7, the given input data Di is input via the corresponding delay unit, where the data Di is represented as $Di=z^{-i}*D(z)$.

As described above, in a first example of a multiplying and adding calculation system according to the prior art (FIGS. 4 and 6) of an array type, a large number of two-input-type floating-point adder-subtractors have to be connected in cascade in order to perform arithmetic operations on multiple-input data. Therefore, a problem occurs that the necessary amount of hardware is likely to increase with an increase of the number of the input data.

Moreover, in such a multiplying and adding calculation device of this type, the arithmetic operations in the floating-point representation are executed by utilizing the construction in which a plurality of two-input-type adder-subtractors are arranged in a tree or array form. In such a construction, the process for adjusting the respective digit positions of mantissas of multiple-input data based on a result of comparison of exponents of the input data, the normalization process, and the like, which are essential for the arithmetic operations in the floating-point representation, are likely to be executed in such a manner that each process is often repeated among a plurality of two-input-type arithmetic units and is adequately dispersed among them. Therefore, another problem occurs that it becomes difficult for the arithmetic operations to be performed at very high speed.

On the other hand, in a second example of a multiplying and adding calculation system according to the prior art of a pipe-line type (FIGS. 5 and 7), a troublesome correcting process of regarding the intermediate results must be executed in accordance with the number of stages of the pipe-line in an adder-substractor. Therefore, still another problem occurs that a relatively long time is required for completing the arithmetic operations, especially, the accumlative addition and substraction calculations.

In general, in such a pipe-line type arithmetic system, as seen in supercomputers, the process at each stage of a pipe-line composed of plural stages is made as simple as possible. By means of such a simplified process at each stage, a method of arithmetic operations, in which the time required for passing each stage is shortened and the number of the whole stages necessary for pipe-line type arithmetic operations (the length of a vector) increases, is usually adopted. When the accumulative adding and subtracting calculations are executed at the speed based on a pipe-line pitch determined by the above-mentioned length of a vector, a partial sum, which is obtained as a result of jump addition executed in the boundary between adjoining stages, is stored in each stage in a dispersed condition. Consequently, still another problem occurs that it becomes necessary for a troublesome supplementary process in the last procedure of arithmetic operations to be executed, in order to treat such a partial sum.

Further, more detailed description of the problem, concerning the operational speed in the first and second examples of the prior art, will be made with reference to FIGS. 8 and 9.

In FIG. 8, two processors 110, 111 have arithmetic units including two-input-type floating-point adder-subtractors in a cascade connection; and accumulators 120, 121 each temporarily storing results of arithmetic operations. Further, registers (abbreviated to "REG" in FIG. 8) 100, 101 for storing input data such as Y(k) for short time are provided corresponding to the processors 110, 111, respectively. In this case, it is assumed that the input data is continuously transferred from the left portion. Further, in this case, it is assumed that the arithmetic operations of the equation $Z(k)=W2*X2+W1*X1+Y(k)$ are executed by utilizing the above-mentioned two processors. The detailed process of the arithmetic operations is as follows.

First, at the time T0, a result of W1*X1 calculated by a first processor 110 is stored in an accumulator 120, and simultaneously data Y(k) is input to a first register 100.

Next, at the time T1, the data Y(k) is input from a first register 100 to a first processor 110, and this processor 110 executes arithmetic operations of W1*X1+Y(k) by adding Y(k) to the content of the accumulator.

Also, at the time T1, a result NA of the arithmetic operations of W1*1+Y(k) is returned to the first register 100, and is transferred from the first register 100 to a second register 101.

At this time, a second processor 111 executed the arithmetic operations of W2*X2. A result calculated by a second processor 111 is stored in an accumulator 121. Further, at the time T2, the result NA is received from the second register 101 by the second processor 111, and this processor 111 executes arithmetic operations of W2*X2+NA by adding Y(k) to the content of the accumulator.

Further, a result NB of the arithmetic operations of $Z(k)=W2*X2+NA$ is returned to the second register

101, and all the arithmetic operations of $Z(k)=W2*X2+W1*X1+Y(k)$ are completed.

In such a process as described above with reference to FIG. 8, the accumulative addition and subtraction calculations of multiple-input data are executed by adequately dispersing them between two processors, in order to realize the method in which, after the content of a process in one arithmetic unit has been completed, the content of next process is started. Due to such a method, the time, that it takes to complete the arithmetic operations after the input of data is started, is increased as the number of input data is increased and the amount of necessary hardware is also increased.

To treat this advantage, it is deemed to be reasonable, that the time interval for the input of data is shortened and that the overall operational time is reduced. In view of this, the case where the same arithmetic operations as those in FIG. 8 are executed by utilizing an arithmetic system of a pipe-line type, will be explained with reference to FIG. 9.

In FIG. 9, two processors 140, 141, including two states of two-input-type floating-point adder-subtractors of the pipe-line type (the same type as in FIG. 5), and pipe-line registers 150, 151 within the arithmetic system, are illustrated. Further, registers (abbreviated to "REG" in FIG. 9) 130, 131 for storing input data such as Y(k) for short time are provided corresponding to the processors 140, 141, respectively.

In this case, a process of the arithmetic operations of $Z(k)=W2*X2+W1*X1+Y(k)$ is executed only by a processor 140, while another process of the arithmetic operations of $Z(k)=W4*X4+W3*X3+Y(k)$ is executed only by another processor 141. Accordingly, it seems that the arithmetic operations in FIG. 9 can be performed at higher speed than those in FIG. 8.

However, in FIG. 9, when the arithmetic operations are executed by the two processors 140, 141, it is necessary that, after the given data Y(k) is added to the data stored in the respective registers 130, 131, a result of the addition should be returned to the respective registers 130, 131. Therefore, even though each processor receives input data from the corresponding register and executes the required arithmetic operations, the processor cannot return the result of the arithmetic operations to the register until the time corresponding to two stages (T0–T2) has elapsed.

In other words, since data transfer speed of the registers is determined by the time required for completion of arithmetic operations of these arithmetic units of two stages (the latency time), the overall operational speed cannot be made higher than a value based on the above-mentioned time of these arithmetic units. Therefore, in the construction such that the data are input to the register or the data are output therefrom, it cannot be expected to increase operational speed based on the effect of a pipe-line, even when the processor of a pipe-line type is utilized.

SUMMARY OF THE INVENTION

In view of the these problems, the main object of the present invention is to provide a floating-point arithmetic system which enables various arithmetic operations including addition and subtraction calculations for large amount of data, that are indicated in the floating-point format, to be executed with relatively small amounts of hardware and at relatively high speed.

Another object of the present invention is to provide a floating-point arithmetic system which can be applied to a digital filter or spatial filter for image processing, by adequately combining addition and subtraction means for executing addition and subtraction calculations on the floating-point data of multiple-input at relatively high speed, a multiplier, and a divider.

To attain the above objects, the floating-point arithmetic system according to the present invention, which allows arithmetic operations, including at least addition and subtraction calculations, to be performed with respect to floating-point data by separating each of the floating-point data into an exponent and a mantissa, includes multiple-input addition and subtraction means for executing addition and subtraction calculations on at least three floating-point data.

Preferably, the multiple-input addition and subtraction means includes multiple-input means which enables at least three floating-point data to be input; and shift-amount determining means which compares the respective exponents in parallel with each other, selects the maximum exponent, and determines the amount of shift in the respective mantissas, based on the maximum exponent.

In this case, the multiple-input addition and subtraction means further includes mantissa shifting means which shifts the respective mantissas in accordance with the amount of shift and makes an adjustment of digit positions of the mantissas; at least one multiple-input adder-subtractor which executes addition and subtraction for the mantissa output from the mantissa shifting means; and a normalization circuit which normalizes a result obtained by the multiple-input adder-subtractor.

Further, preferably, the shift-amount determining means includes a parallel comparator which compares the respective exponents in parallel with each other, with respect to the magnitude of the exponents; a sequence-discrimination circuit which selects the maximum exponent in accordance with an output from the parallel comparator; and a parallel-exponent-subtraction circuit which calculates a difference between a value of the maximum exponent and a value of each of the exponents, so as to determine the amount of shift in the respective mantissas.

Further, preferably, the parallel comparator includes a parallel comparison circuit which has a plurality of positive number comparators provided corresponding to the number of combinations among the floating-point data. In this case, these positive number comparators compares the respective exponents of the two different floating-point data with each other in regard to each of the combinations.

Further, preferably, the sequence-discrimination circuit includes a look up table which outputs a select signal for selecting the maximum exponent in accordance with a result of comparison obtained by each of the positive number comparators.

Further, preferably, the mantissa shifting means includes at least one multiplexer which executes a shift operation by the length of a plurality of digits with respect to each of the mantissas of the floating-point data.

In the floating-point arithmetic system of the present invention, addition and subtraction calculations of multiple-input data (more than two-input data) can be executed by a single addition and subtraction means, which can be realized by one LSI (Large Scale Integrated Circuit) due to the remarkable improvement of integration technology. Therefore, the amount of hardware can be reduced. Also, delay time caused by a plurality of addition and subtraction means, e.g., two-input-type arithmetic units, is extremely shortened, and arithmetic operations of large amounts of data can be performed at very high speed.

Further, in such a construction, by virtue of a parallel comparator which compares the exponents of multiple-input data in a short time and a sequence-discrimination circuit which selects the maximum exponent rapidly, it becomes possible for the complicated arithmetic operations of the exponents to be performed at very high speed.

Further, in some preferred embodiments, such a floating-point arithmetic system is realized by constituting an accumulative addition and subtraction calculation device by means of the above-mentioned multiple-input addition and subtraction means. Further, such a system is also realized by combining the multiple-input addition and subtraction means, and at least one multiplier or divider.

Such a construction based on the multiple-input addition and subtraction means can be applied to a digital filter or spatial filter for image processing, since the multiple-input addition and subtraction means enables arithmetic operations of large amounts of data to be performed at very high speed.

BRIEF DESCRIPTION OF THE DRAWINGS

The above object and features of the present invention will be more apparent from the following description of the preferred embodiments with reference to the accompanying drawings, wherein:

FIG. 1 is a diagram showing some examples in which data in the normalized floating-point representation are usually indicated;

FIG. 2 is a map illustrating how FIGS. 2(A) and 2(B) connect together

FIGS. 2(A) and 2(B) are flowcharts for explaining the adding process of floating-point data according to the prior art;

FIG. 3 is a diagram showing some examples in which addition and subtraction calculation of floating-point data are executed by the process of FIGS. 2(A) and 2(B);

FIG. 8 is a conceptual view for explaining a flow of multiplying and adding calculations with respect to time in a first example of an arithmetic system according to the prior art;

FIGS. 15(I) to 15(III) are block diagrams each showing the main part of FIG. 14 in detail;

DESCRIPTION OF THE PREFERRED EMBODIMENTS

Before describing the embodiments of the present invention, the fundamental principle of the present invention will be described in comparison with the construction of the prior art, with reference to FIGS. 10 and 11, so as to clarify the features of an arithmetic system according to the present invention.

Figure 10:
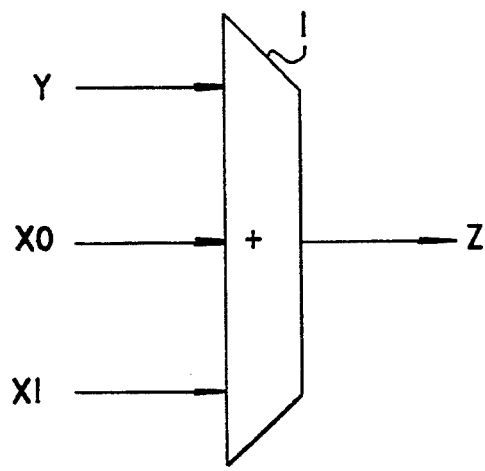
FIG. 10 is a block diagram for explaining the fundamental principle of the present invention.

FIG. 10 is a block diagram for explaining the fundamental principle of the present invention.

As shown in FIG. 10, a floating-point arithmetic system according to the present invention, which allows the arithmetic operations including at least addition and subtraction to be performed, includes at least one multiple-input addition and subtraction means 1 for executing addition and subtraction calculations of at least three floating-point data X0, X1 and Y(Z=X0+X1+Y).

In the present invention, considerable attention is paid to the fact that a circuit of relatively large size, which it has been deemed to be difficult to integrate until now, can be realized, due to a remarkable increase in the number of logic gates which can be contained in a single LSI with an improvement of the integration technology. Thus, a single addition and subtraction means 1, which can treat multiple-input floating-point data, i.e., at least three floating-point data, is realized.

Figure 11:
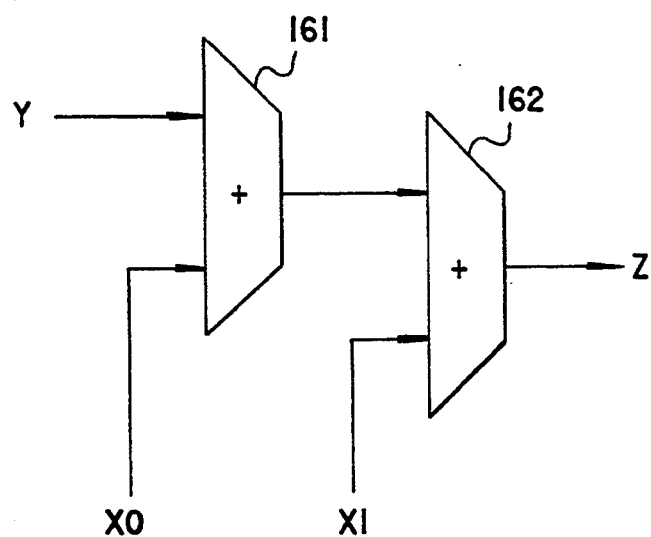
FIG. 11 is a block diagram showing a fundamental construction of an arithmetic system according to the prior art, which is to be compared with the principle of the present invention.

Here, to clarify the difference between an arithmetic system according to the present invention and an arithmetic system according to the prior art, the construction of the arithmetic system of the typical example (first example) of the prior art will be illustrated again in FIG. 11.

In FIG. 11, when addition and subtraction calculations are performed for three or more than three floating-point data, a plurality of floating-point addition and subtraction means of two-input-type 161, 162 are connected in cascade to execute the accumulative addition and subtraction calculations.

On the contrary, in the present invention shown in FIG. 11, addition and subtraction calculations of multiple-input floating-point data are performed in parallel by operating a single addition and subtraction means of multiple-input type 1, instead of a plurality of floating-point addition and subtraction means. Accordingly, the required amount of hardware can be reduced.

Further, it becomes unnecessary for the addition and subtraction means, e.g., adder-subtractor, to be connected in cascade. Therefore, delay time caused by the addition and subtraction means becomes negligible and arithmetic operations can be performed at very high speed.

Figure 12:
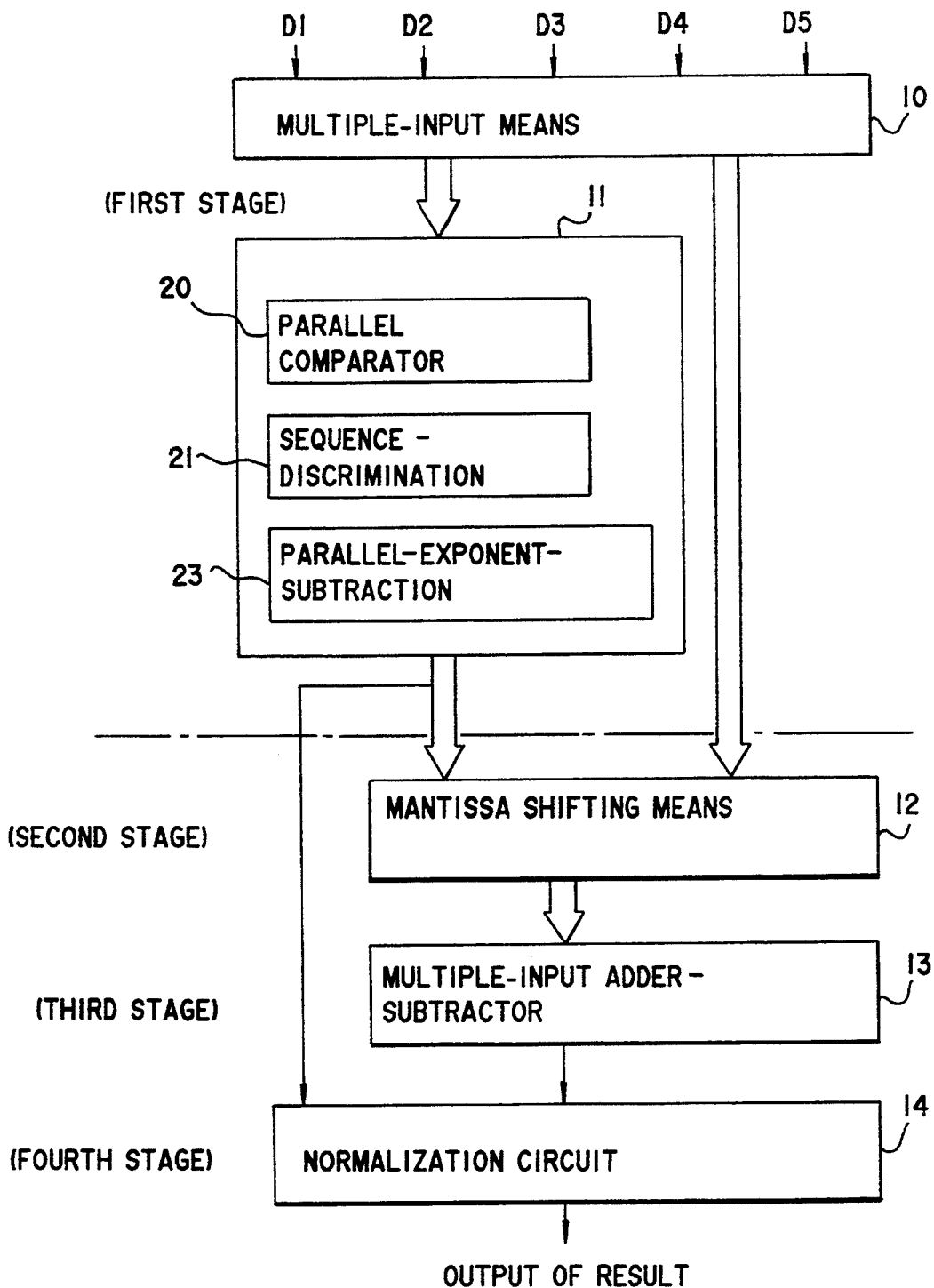
FIG. 12 is a block diagram showing an essential embodiment based on the principle of the present invention.

FIG. 12 is a block diagram showing an essential embodiment based on the principle of the present invention. In this case, the construction of multiple-input floating-point arithmetic unit, which constitutes the main part of an addition an subtraction means of multiple-input type, is illustrated representatively.

A multiple-input floating-point arithmetic unit shown in FIG. 12 includes a multiple-input means 10 to which (n+1) kinds of data D1-D5 can be input. Further, the addition and subtraction calculations of these (n+1) kinds of data are executed by utilizing a pipe-line process of n stages. In the example of FIG. 12, a value of n is set at "4". Here, it should be noted that the present invention is not restricted to a multiple-input addition and subtraction means of the pipe-line type.

In FIG. 12, shift-amount determining means 11 is a circuit, which compares the respective exponents of said floating-point data in parallel with each other, selects the maximum exponent from all the exponents, and determines the amount of shift in the respective mantissas of the floating-point data, based on the maximum exponent.

Mantissas shifting means 12 is a circuit, which shifts the respective mantissas of the floating-point data in accordance with the amount of shift determined by the shift-amount determining means 11, and makes an adjustment of digit positions of the mantissas.

A multiple-input adder-subtractor 13 is a circuit that executes addition and subtraction for the mantissas in which an adjustment of digit positions thereof is completed.

A normalization circuit 14 is a circuit which normalizes and outputs a result of the addition and subtraction obtained by the multiple-input adder-subtractor 13.

Further, the shift-amount determining means 11 has a parallel comparator 20, a sequence-discrimination circuit 21 and a parallel-exponent-subtraction circuit 23.

The parallel comparator 20 is a circuit which compares in parallel the respective exponents of five floating-point data that are input with each other, with respect to the magnitude of the exponents.

The sequence-discrimination circuit 21 is a circuit which selects the maximum exponent in accordance with an output from the parallel comparator 20.

The parallel-exponent-subtraction circuit 23 is a circuit which calculates a difference between a value of the maximum exponent selected by the sequence-discrimination circuit 21 and a value of each of the exponents of the floating-point data, so as to determine the amount of shift in the respective mantissas of the floating-point data.

In the essential embodiment shown in FIG. 12, in order to realize addition and subtraction calculations of multiple-input floating-point data, first, the maximum value among the exponents is discriminated by the parallel comparator 20 and the sequence-discrimination circuit 21. The parallel comparator 20 is constituted by a plurality of comparison circuits, while the sequence-discrimination circuit 21 is constituted by a look up table, etc. Next, the difference between a value of the maximum exponent selected by the sequence-discrimination circuit 21 and a value of each of the exponents of the floating-point data is calculated by the parallel-exponent-subtraction circuit 23. This subtraction circuit 23 is constituted by a plurality of integer subtractors.

In accordance with a value of the difference, a shift operation is executed by either one multiplexer or plural multiplexers with respect to each of the mantissas of the floating-point data. Further, addition or subtraction of the mantissas is executed by the multiple-input adder-subtractor 13 which is constituted by tree type or array type adder-subtractor. Upon reviewing a result of the addition and subtraction, an addition of exponent and a shift operation of mantissas are executed, if necessary, and a normalization process is executed.

In this case, the multiple-input floating-point arithmetic unit is composed of four stages. Especially, in a first stage, the most troublesome comparing operations of exponents among floating-point arithmetic operations are executed in such a manner that the respective exponents are compared in parallel, in order to shorten the execution time at this stage. Further, in a third stage, the arithmetic operations regarding mantissas are executed in a conventional manner, for example, by means of tree type or array type adder-subtractor, since addition and subtraction of mantissas can be easily completed.

Consequently, the advantage of an arithmetic system of the pipe-line type, that arithmetic operations are performed at relatively high speed at each stage, can be fully utilized.

Figure 13:
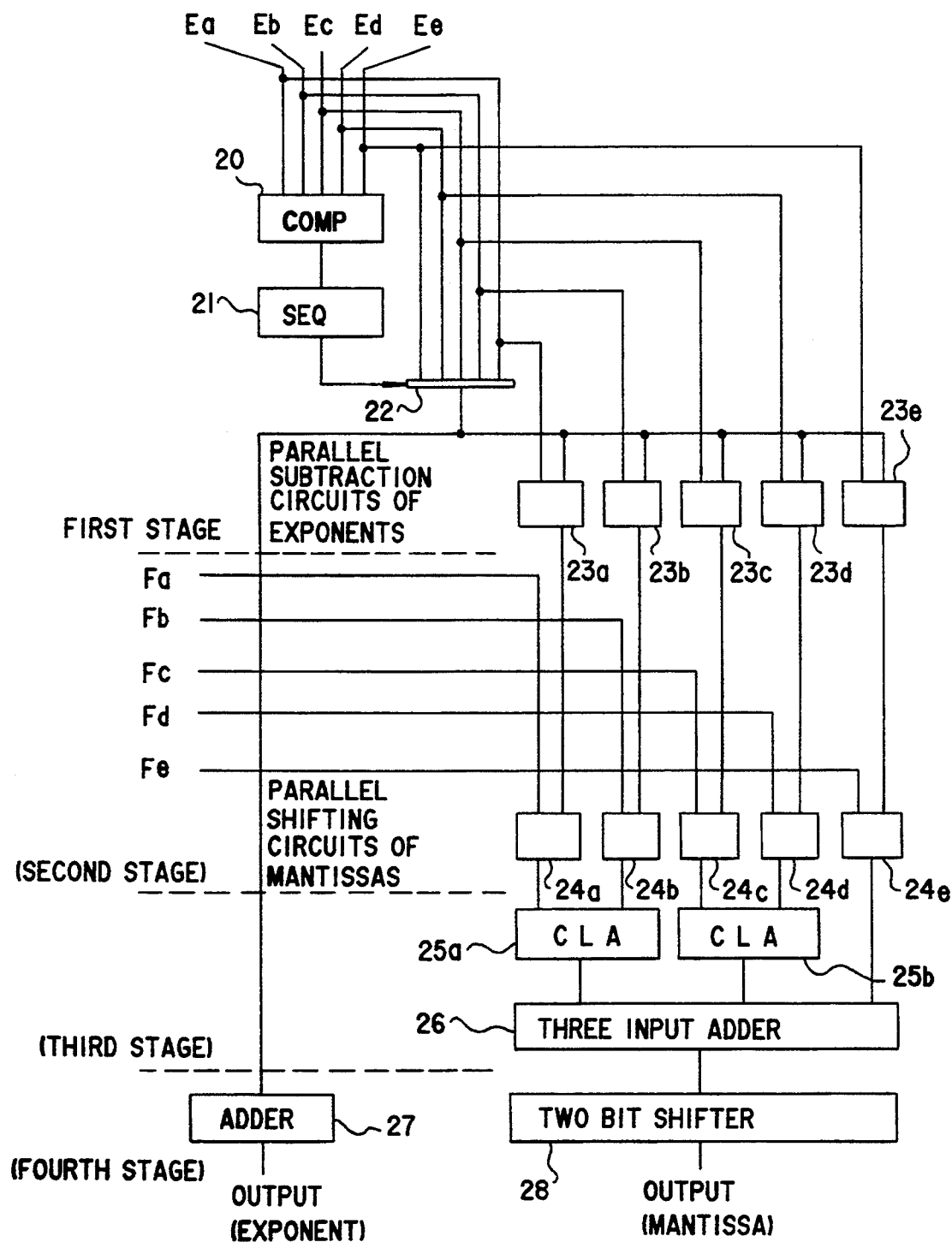
FIG. 13 is a block diagram showing the construction of a multiple-input arithmetic unit of a first concrete embodiment according to the present invention.

FIG. 13 is a block diagram showing the construction of a multiple-input arithmetic unit of a first concrete embodiment according to the present invention. Hereinafter, any component that is the same as that mentioned before will be referred to using the same reference number.

A floating-point addition and subtraction calculation unit of a multiple-input type as shown in FIG. 13 is designed to perform adding and subtracting calculations of floating-point data of five-input data by means of a pipe-line process composed of four stages. Further, the respective exponents of the five floating-point data are defined as Ea, Eb, Ec, Ed and Ee, while the respective mantissas of the five data are defined as Fa, Fb, Fc, Fd and Fe.

In a first stage of the construction of a pipe-line type, the respective exponents of the five floating-point data are compared in parallel with each other, with respect to the magnitude of the exponents, by a parallel comparator (COMP) 20. Also, the maximum exponent is discriminated by a sequence-discrimination circuit (SEQ) 21. Further, the maximum exponent discriminated in the circuit 21 is selected by an exponent-selection circuit 22. Further, by means of parallel subtraction circuits of exponents 23a, 23b, 23c, 23d and 23e, the respective values of the exponents of the five floating-point data are subtracted from a value of the maximum exponent in parallel, and the amounts of shift in the respectively corresponding mantissas are determined.

In a second stage of the above-mentioned construction, the respective mantissas Fa, Fb, Fc, Fd and Fe of the five floating-point data are shifted in parallel, in accordance with the respective outputs from the parallel subtraction circuits of exponents 23a, 23b, 23c, 23d and 23e, by means of parallel shifting circuits of mantissas 24a, 24b, 24c, 24d and 24e. In this case, by providing either one stage of a multiplexer or plural stages of multiplexers, a shift operation can be executed by the length of plurality of digits.

In a third stage of the above-mentioned construction, an addition of the mantissas Fa, Fb, Fc, Fd and Fe, in which the adjustment of the respective digit positions thereof is completed, is executed by CLA addition and subtraction circuits (Carry Look-Ahead addition and substraction circuits) of two-input-type 25a, 25b and by a three-input adder 26.

In a fourth stage of the above-mentioned construction, a result of the addition in a third stage is normalized by an adder 27 and a two bit shifter 28.

In the above-mentioned first concrete embodiment as shown in FIG. 13, a floating-point addition and subtraction calculation unit of (n+1) input type is constituted as an arithmetic unit of a pipe-line type of n stages. Especially, by adopting the construction of a pipe-line type including data transfer path and an arithmetic unit, the arithmetic unit effective for performing arithmetic operations at higher speed can be realized.

Figure 14:
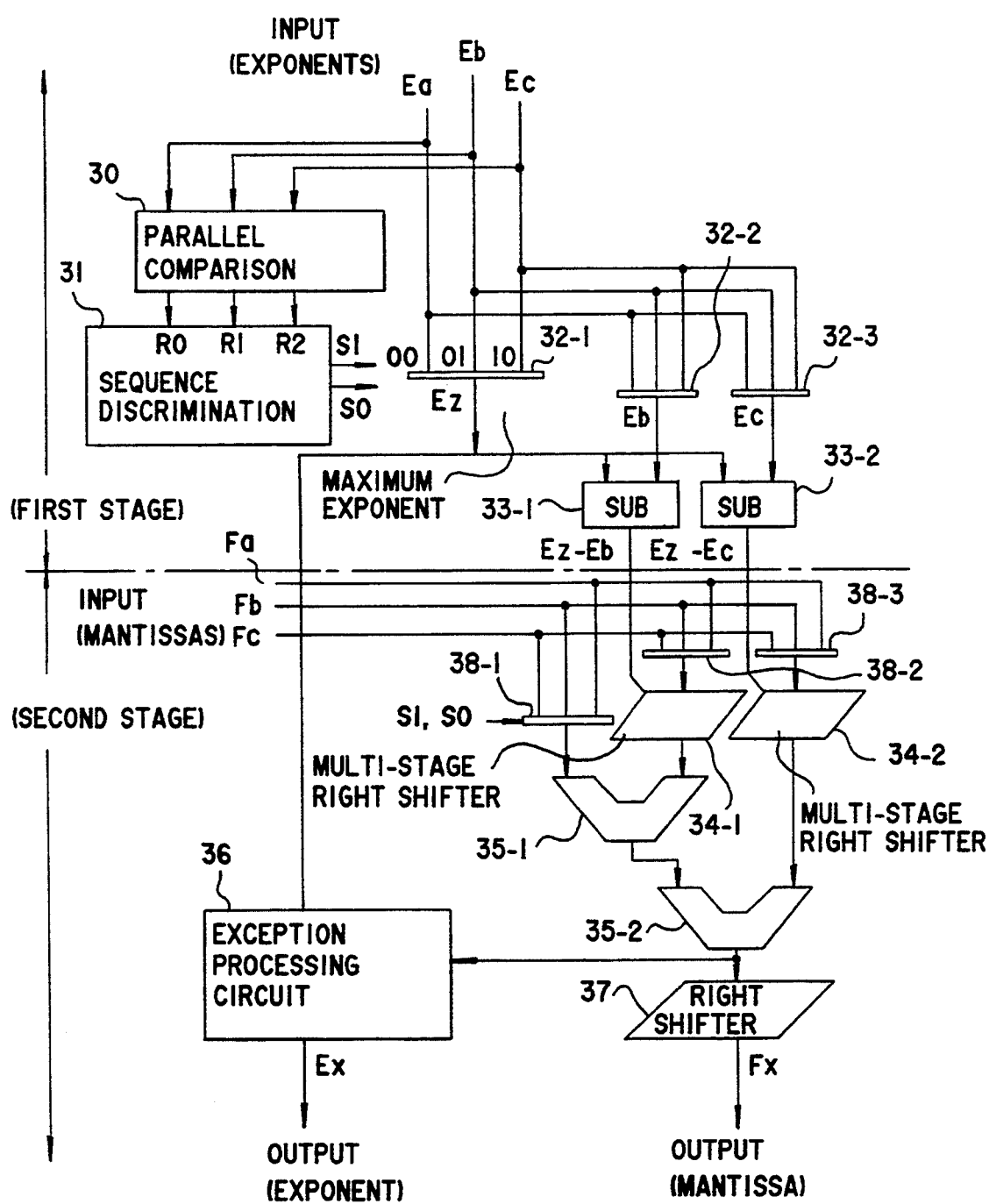
FIG. 14 is a block diagram showing the construction of a multiple-input arithmetic unit of a second concrete embodiment according to the present invention.
Figure 15:
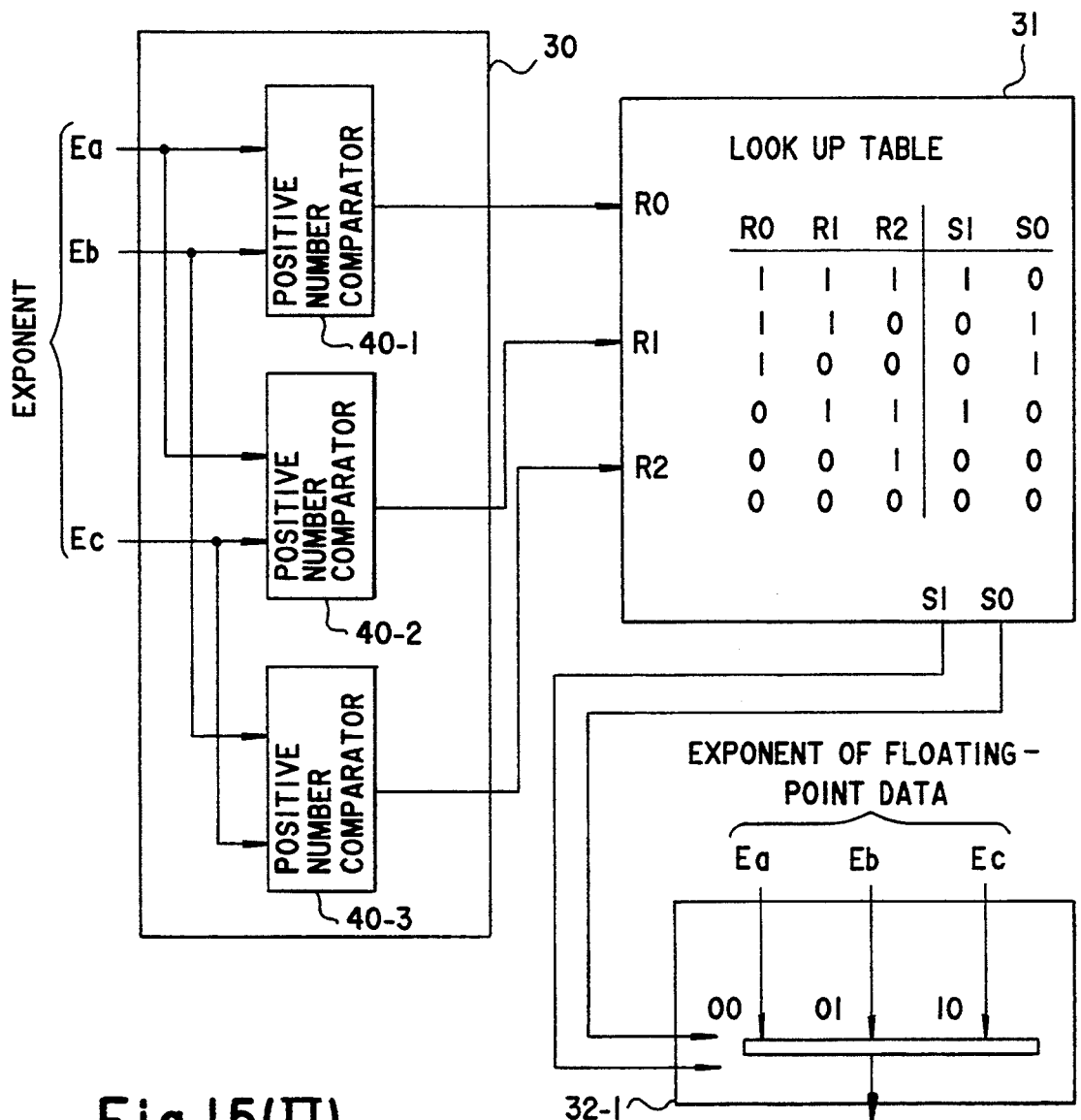

FIG. 14 is a block diagram showing the construction of a multiple-input arithmetic unit of a second concrete embodiment according to the present invention, and FIG. 15 (I) to 15 (III) are block diagrams each showing the main part of FIG. 14 in detail. In this case, the construction of a floating-point addition and subtraction calculation unit of three-input type, in which three kinds of input data are treated, is illustrated representatively. Further, in this case, a plurality of exponent selection circuits and a plurality of mantissas selection circuits corresponding to the number of input data (three) are provided.

A parallel comparison circuit 30 (corresponding to a parallel comparator 20 in FIG. 13) in FIG. 14 is typically constituted by three kinds of positive number comparators 40-1, 40-2 and 40-3, as shown in FIG. 15(I). A first positive number comparator 40-1 compares two exponents Ea, Eb that are input thereto with each other, as shown in FIG. 15(II). A second positive number comparator 40-2 compares two exponents Ea, Ec that are input thereto with each other. A third positive number comparator 40-3 compares two exponents Eb, Ec that are input thereto with each other. These positive number comparators have only to be provided in the number corresponding to the number of combination among input data. For example, when the number of input data is three, the necessary number of positive number comparators becomes three ($_3C_2=3$). Further, when the number of input data is four, the necessary number of positive number comparators becomes six ($_4C_2=6$).

A value of an output R0 of the first positive number comparator 40-1 is assumed to be "1", when Eb is larger than Ea, while it is assumed to be "0", when Ea is equal to or larger than Eb, as shown in FIG. 15(III). Similarly, a value of an output R1 of the second positive number comparator 40-2 and a value of an output R2 of the third positive number comparator 40-3 become "1" or "0", in accordance with the relation of magnitude between two-input data (two exponents).

A sequence-discrimination circuit 31 is constituted by a look up table to which the outputs R0, R1 and R2 are input and from which selects signals S1, S0 are issued, as shown in FIG. 15(I). An exponent selection circuit 32-1 is a circuit which selects the maximum exponent among three exponents Ea, Eb and Ec. Further, other selection circuits 32-2, 32-3 are circuits which select the exponents other than the maximum exponent.

For example, when the exponents Ea, Eb and Ec have the relationship of Ea>Eb>Ec, values of the outputs R0, R1 and R2 of the parallel comparison circuit 30 become "0", "0" and "0", respectively. If these values are input to the sequence-discrimination circuit 31, values of select signals S1, S0 become "0", "0", respectively. Consequently, the exponent selection circuit 32-1 select the maximum exponent Ea.

On the other hand, when the exponents Ea, Eb and Ec has the relationship of Ec>Eb>Ea, values of the outputs R0, R1 and R2 of the parallel comparison circuit 30 become "1", "1" and "1", respectively. If these values are input to the sequence-discrimination circuit 31, values of select signals S1, S0 become "1", "0", respectively. Consequently, the exponent selection circuit 32-1 selects the maximum exponent Ec.

If the maximum exponent selected by the exponent selection circuit 32-1 is defined as Ez, as shown in FIG. 14, integer subtractors (SUB) 33-1, 33-2 calculate two kinds of values other than "0" among Ez-Ea, Ez-Eb and Ez-Ec. A result of these calculations can be utilized as the amount of shift of the mantissas.

Further, a mantissas selection circuit 38-1 is a circuit which selects the mantissa (assumed to be Fa here) of the floating-point data having the maximum exponent (assumed to be Ea here) on the basis of select signals S1, S0. Furthermore, other selection circuits 38-2, 38-3 are circuits which select the mantissas other than the above-mentioned mantissa.

A multi-stage right shifter 34-1 shifts the mantissa Fb by a value of Ez-Eb in the right direction.

On the other hand, another multi-stage right shifter 34-2 shifts the mantissa Fc by a value of Ez-Ec in the right direction.

The mantissas Fb, Fc, in which the adjustment of digit positions has been made by executing such a right shift operation, are added together by an adder-subtractor 35-1. Further, a result of an addition by the adder-subtractor 35-1 and the mantissa Fa are added together by an adder-subtractor 35-2. An exception processing circuit 36 and a right shifter 37 are circuits which perform the normalization process similar to that in two-input-type floating-point adder-subtractor of the prior art. As a result of the normalization process, a floating-point data having an exponent Ex and a mantissa Fx can be finally output.

In the second concrete embodiment described above, an example of a floating-point addition and subtraction calculation unit of the three-input type is explained. However, such a construction of the second concrete embodiment can be easily extended to a floating-point addition and subtraction calculation unit of at least four-input type.

Figure 16:
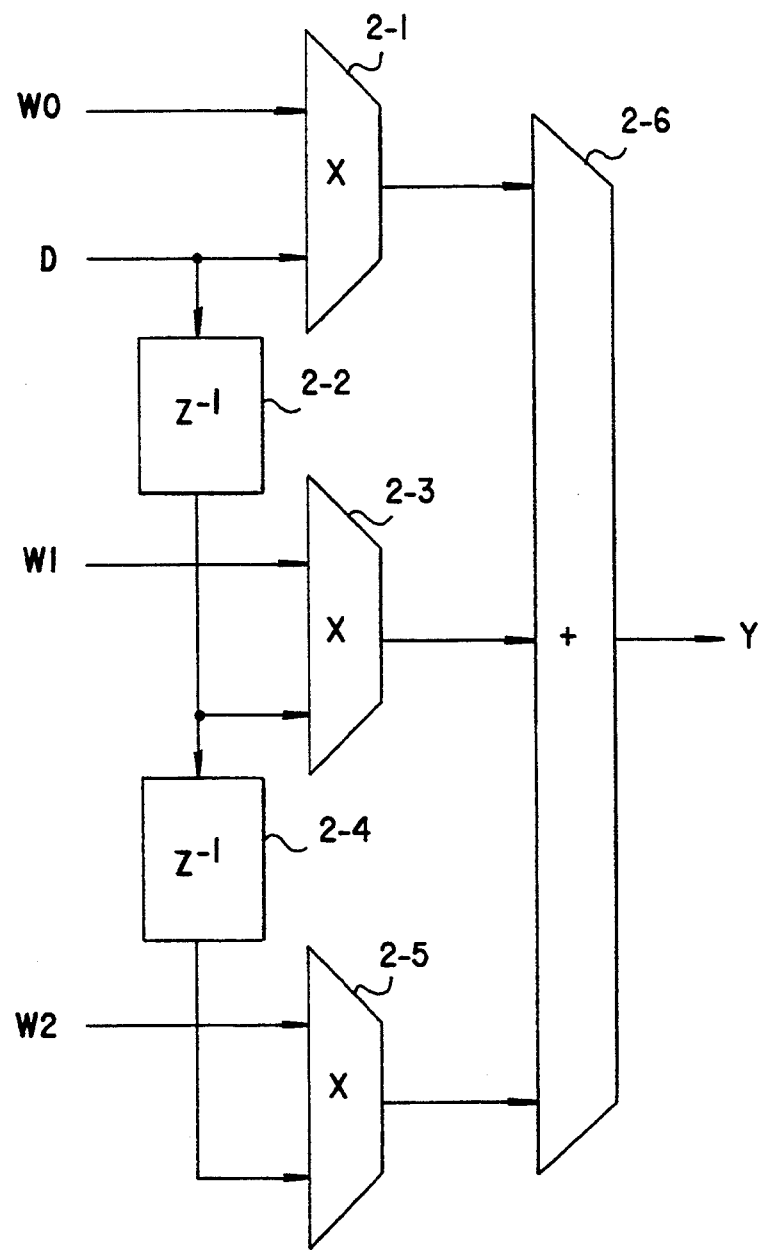
FIG. 16 is a block diagram showing a multiplying and adding calculation system constituted on the basis of FIG. 14.

FIG. 16 is a block diagram showing a multiplying and adding calculation system constituted on the basis of FIG. 14. In this case, as in the equation $Y(z)=(W0^*+W1^*z^{-1}+W2^*z^{-2})D(z)$, a multiplying and adding calculation system according to the present invention, for executing multiplying and adding calculations including accumulative addition and subtraction calculations of three floating-point data, is illustrated.

In FIG. 16, a multiplying and adding calculation unit is constituted by combining a single floating-point addition and subtraction calculation unit of the three-input type 2-6, a plurality of conventional multipliers 2-1, 2-3 and 2-5, and a plurality of delay units 2-2, 2-4.

Figure 2B:
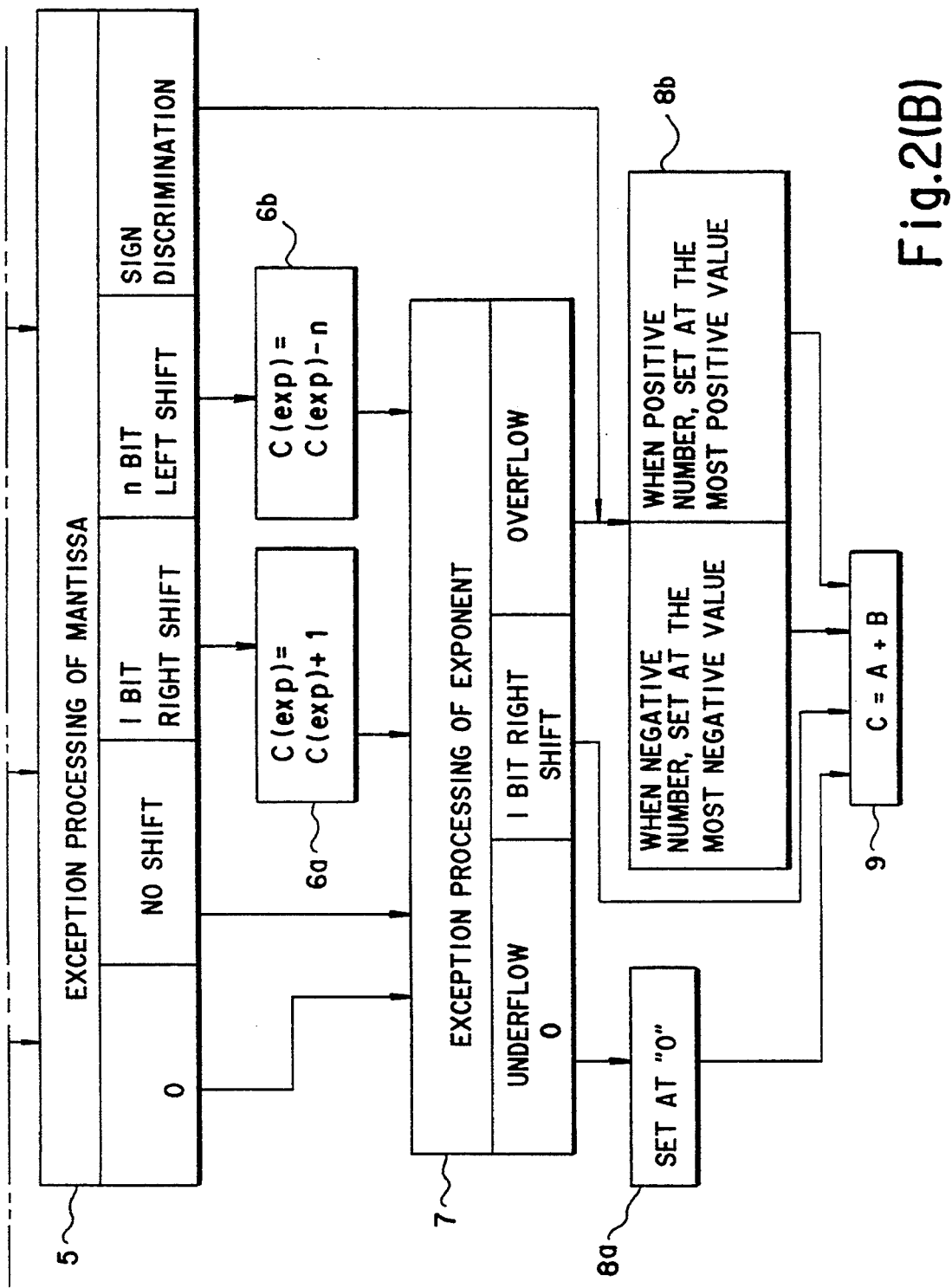
Figure 4:
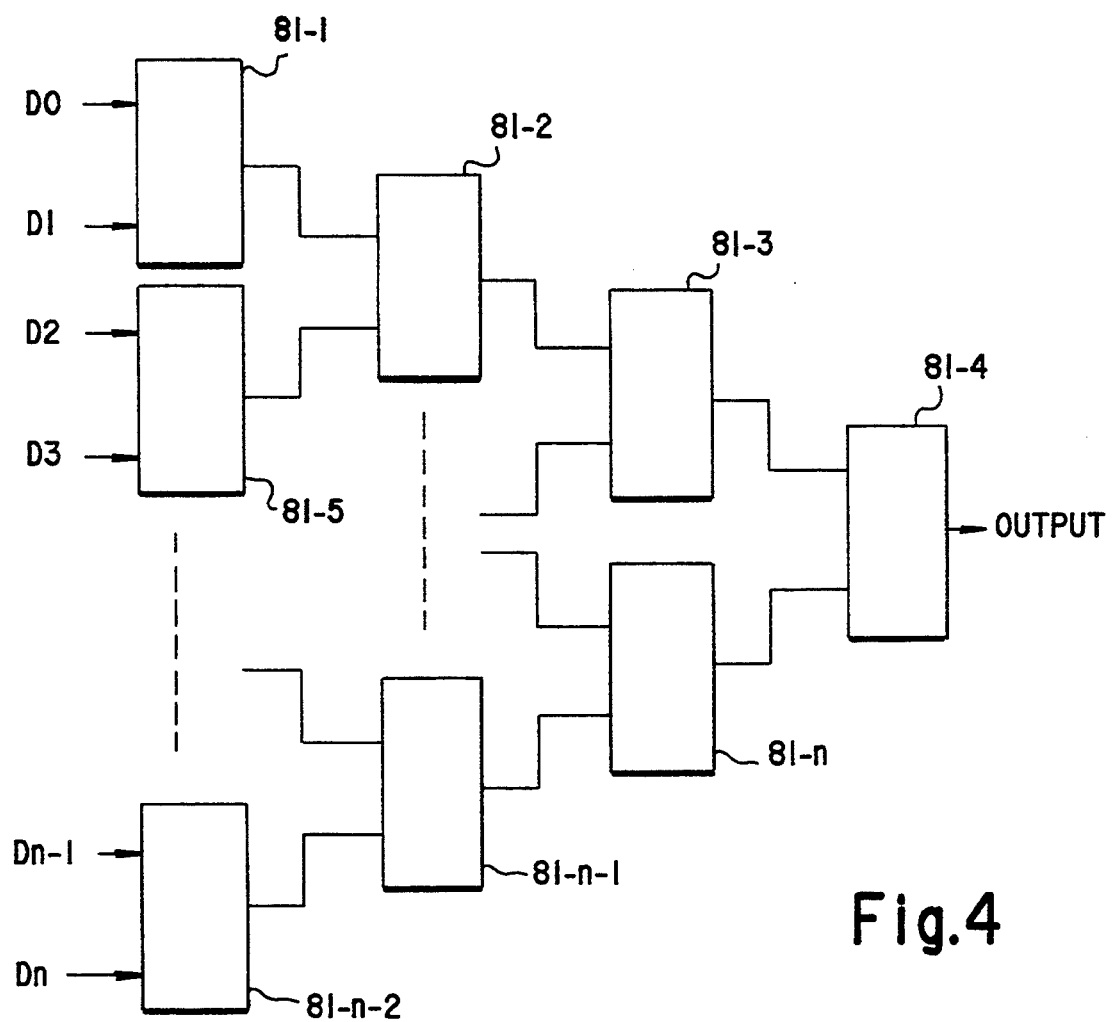
FIG. 4 is a block diagram showing the construction of a first example of two-input-type floating-point adder-subtractors constituting the main part of floating-point arithmetic system according to the prior art.
Figure 5:
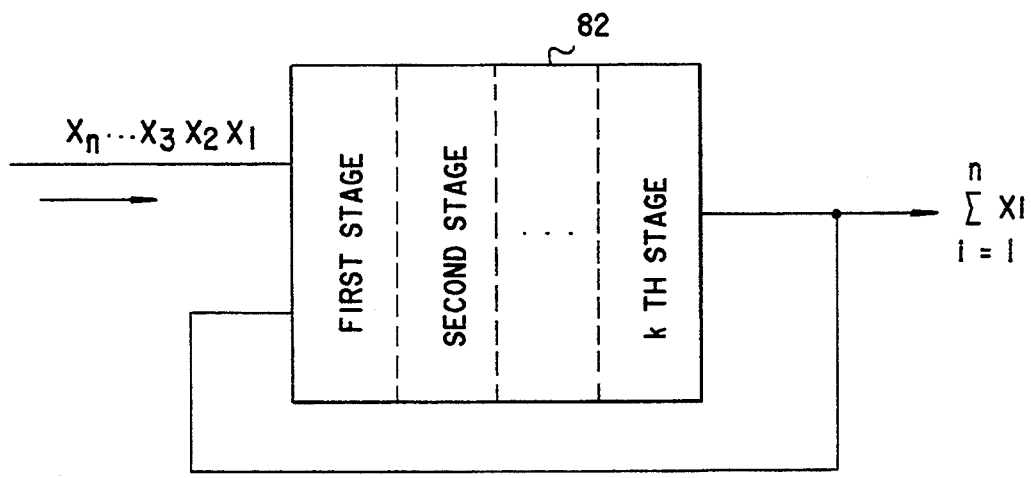
FIG. 5 is a block diagram showing the construction of a second example of two-input-type floating-point adder-subtractors constituting the main part of floating-point arithmetic system according to the prior art.
Figure 6:
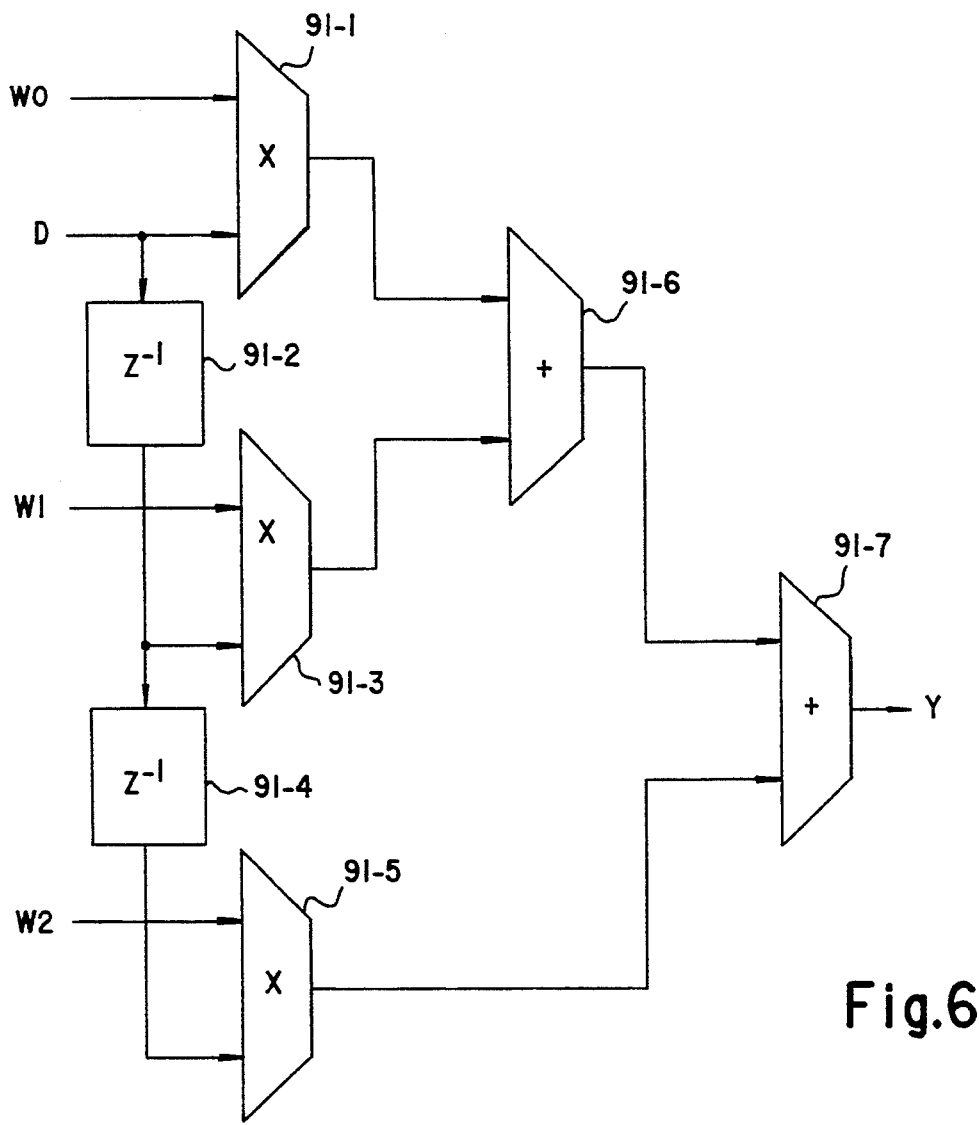
FIG. 6 is a block diagram showing the constructions of a first example of multiplying and adding calculation system according to the prior art, including at least one floating-point adder-subtractor of two-input-type.
Figure 7:
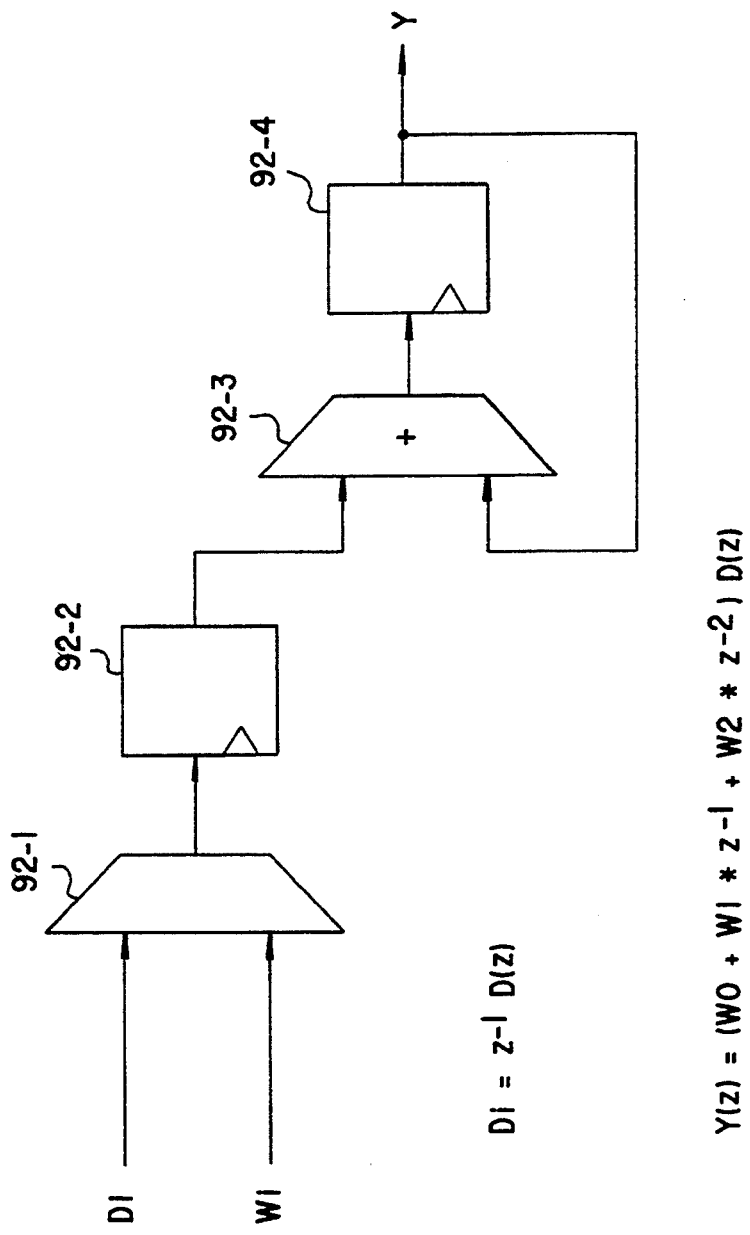
FIG. 7 is a block diagram showing the construction of a second example of multiplying and adding calculation system according to the prior art, including at least one floating-point adder-subtractor of two-input-type.

In the case where the above-mentioned multiplying and adding calculations are executed by a multiplying and adding calculation system according to the prior art (for example, refer to FIG. 6), it was necessary for two stages of two-input type floating-point adder-subtractors to be provided. On the other hand, in the case where the above-mentioned multiplying and adding calculations are executed by a multiplying and adding calculation system in FIG. 16, only one stage floating-point addition and subtraction calculation unit, of the three-input type 2-6 has, to be provided. Therefore, according to FIG. 16, the amount of hardware can be reduced due to a simplification of arithmetic units. Also, delay time caused by a plurality of two input type adder-subtractor, etc., is considerably shortened, and arithmetic operations on large amounts of data can be performed at very high speed.

Figure 17:
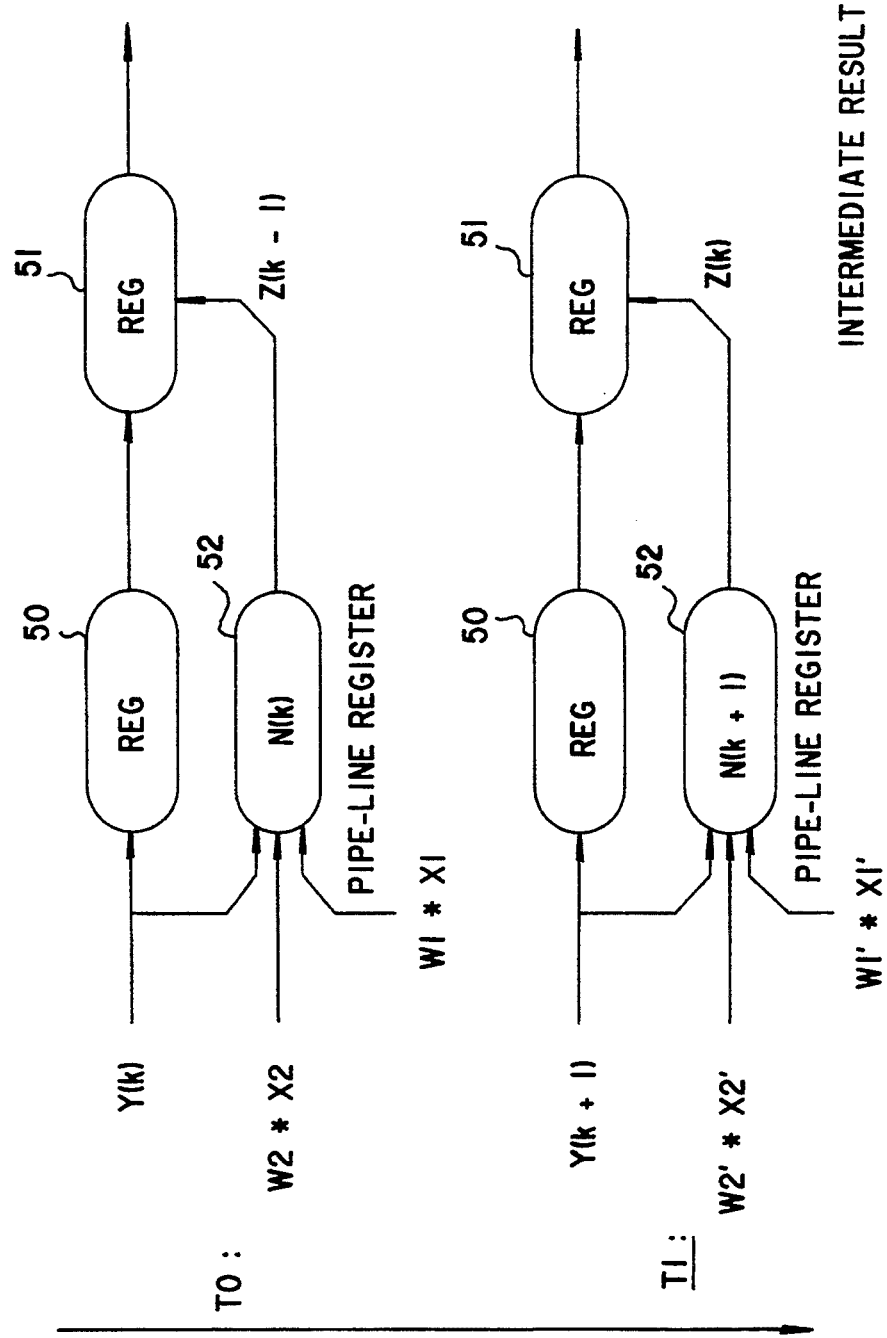
FIG. 17 is a conceptual view for explaining a flow of multiplying and adding calculations with respect to time in a multiple-input arithmetic system of a second concrete embodiment according to the present invention.

FIG. 17 is a conceptual view for explaining a flow of multiplying and adding calculations with respect to time in a multiple-input arithmetic system of a second concrete embodiment according to the present invention. In FIG. 17, it is assumed that arithmetic operations of $Z(k-1)=W2^*X2+W1^*X1+Y(k)$ are performed.

Figure 9:
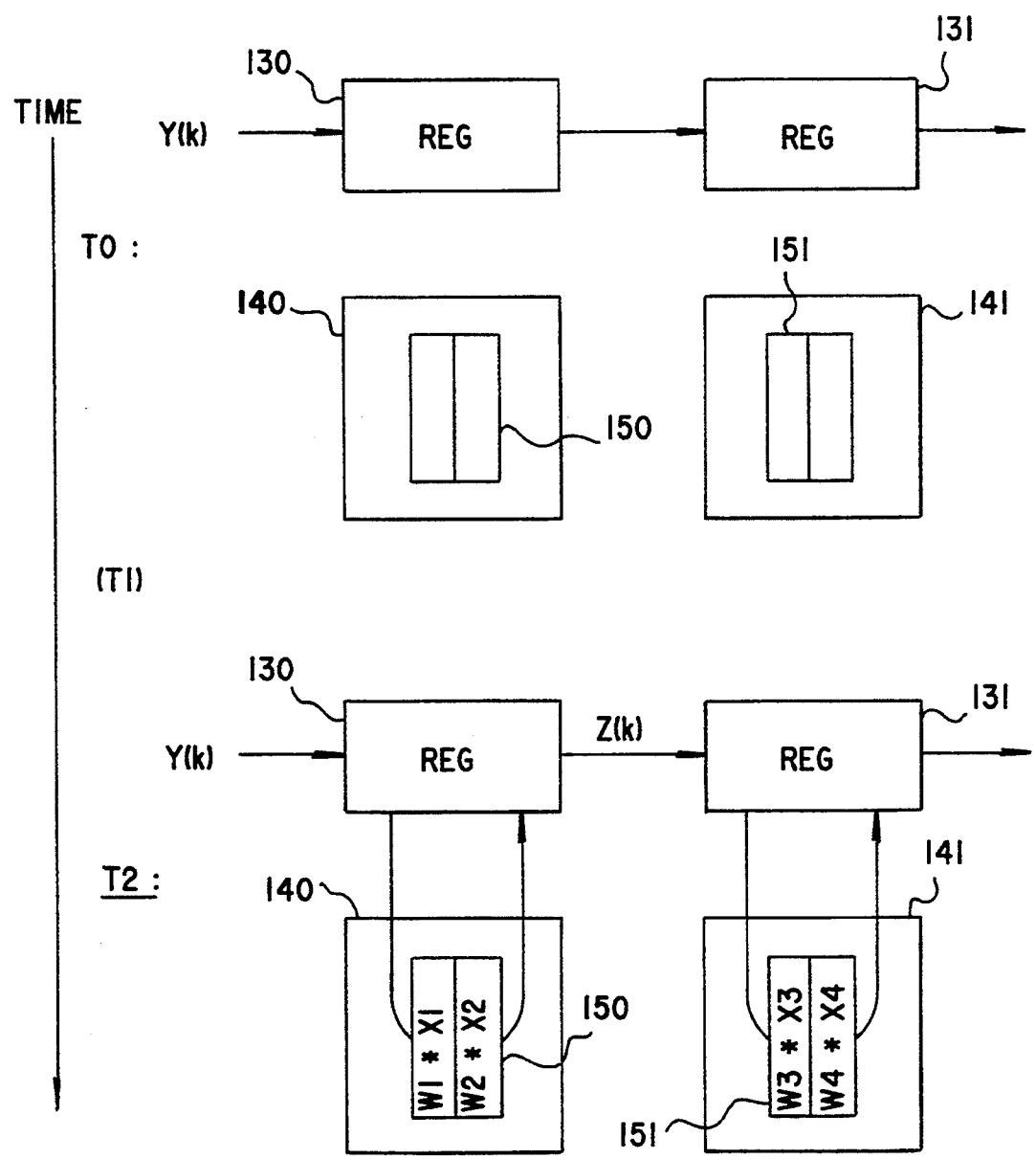
FIG. 9 is a conceptual view for explaining a flow of multiplying and adding calculations with respect to time in a second example of an arithmetic system according to the prior art.

In this case, the arithmetic process, which has been performed by utilizing two processors in the prior art as previously described in FIG. 9, can be executed by a single arithmetic unit which includes a pipe-line register 52 that functions as temporary storage means for storing an intermediate result N(k). Further, such a process is performed by an arithmetic unit of a pipe-line type. Accordingly, the next data W1*X1 can be input when the time of lapse ticks one clock cycle, and the further next data W2*X2 can be input when the time of lapse ticks two clock cycles. Therefore, by virtue of an arithmetic unit according to the present invention of FIG. 17, the arithmetic unit for (n+1) kinds of input data can be realized in n stages. In such a construction, the advantage which the pipe-line construction originally has can be easily utilized, by executing accumulative addition and subtraction calculations in synchronism with clocks of n stages. The arithmetic system of a pipe-line type is effective especially for the matter concerning data communication (for example, often used in an algorithm for a systolic array).

Namely, according to FIG. 17, the arithmetic system of a pipe-line type can be constituted in such a manner that a data transfer path having registers (REG) 50, 51 and the arithmetic unit having a pipe-line register 52 are included in the pipe-line process. Therefore, it becomes possible to make the pitch of pipe-line conform to the pitch of a data transfer path. Consequently, in the arithmetic system of a pipe-line type according to FIG. 17, the register 52 can store another intermediate result N(k+1) at the time T1, since it is unnecessary for the arithmetic unit to wait for the former intermediate result N(k) for the time corresponding to two stages (T0-T2). In such a construction, since the next arithmetic operations of $Z(k)=W2^*X2+W1^*X1+Y(k+1)$ can be performed from the time T1, an arithmetic process of higher speed can be easily realized.

Figure 18:
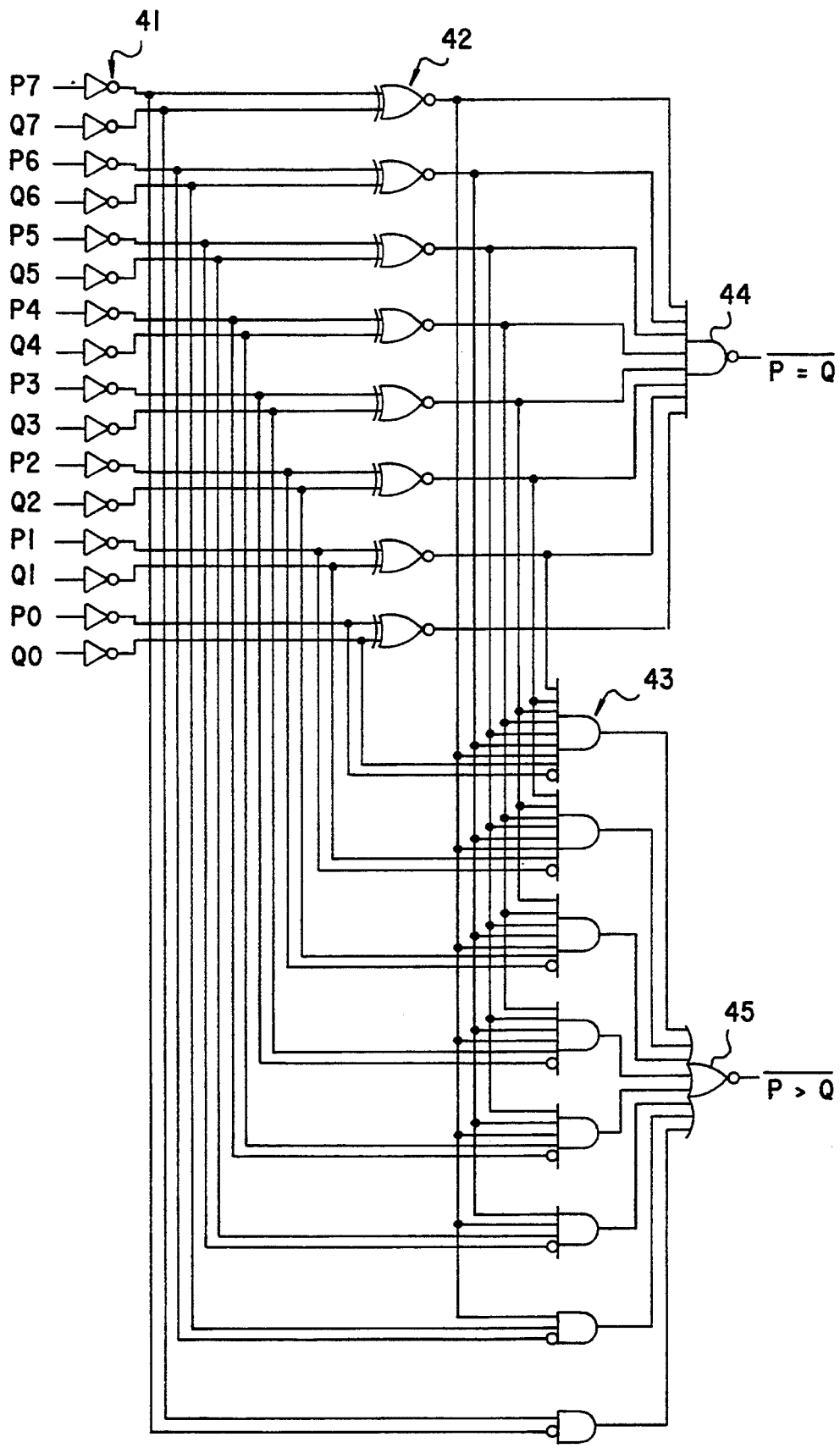
FIG. 18 is a circuit diagram showing a concrete example of a positive number comparator of FIG. 15(I)

FIG. 18 is a circuit diagram showing a concrete example of a positive number comparator of FIG. 15(I). In this case, a description will be made of an example in which the exponents of floating-point data are compared with each other, by utilizing a comparison circuit, i.e., a positive number comparator, for comparing two binary data P, Q each composed of eight bits.

In FIG. 18, the comparison circuit includes a plurality of exclusive-NOR circuits 42, to which values of the respective digits P0-P7, Q0-Q7 of the data P, Q are input in parallel via a plurality of inverters 41, so that the comparison circuit can be operated with negative logic.

By means of these Exclusive NOR circuits 42, values of the respective digits P0-P7, Q0-Q7 of the data P, Q are compared with each other. As a result of such a comparison, if values of all the respective digits correspond with each other, a conformity signal(P=Q) of negative logic indicating a correspondence between the two data P and Q is output from a NAND circuit 44. On the other hand, if it is detected by a plurality of inhibit gate circuits 43 that a value of any one of the respective digits does not correspond with each other, a nonconformity signal (P>Q) of negative logic indicating a discordance between the two data P, Q is output from the NOR circuit 45.

In this case, since the relation of magnitude between the two data P, Q has to be discriminated, a comparison circuit has the logic construction such that the nonconformity signal (P>Q) is output only when a value of one data P is larger than that of other data Q. Further, in FIG. 18, a comparison circuit constituted in negative logic is illustrated representatively. However, it is also possible to realize a positive number comparator by utilizing a comparison circuit constituted in positive logic.

It has been deemed to be difficult for the above-mentioned circuit of relatively large size including large amounts of logic gates to be integrated until now. However, in the present invention, attention is paid to the fact that the circuit of relatively large size can be realized, due to a remarkable increase in the number of logic gates which can be contained in a single LSI with an improvement of the integration technology. Further, by preparing a number of comparison circuits as shown in FIG. 18, the parallel comparison of the respective exponents of multiple-input floating-point data can be easily realized.

Figure 19:
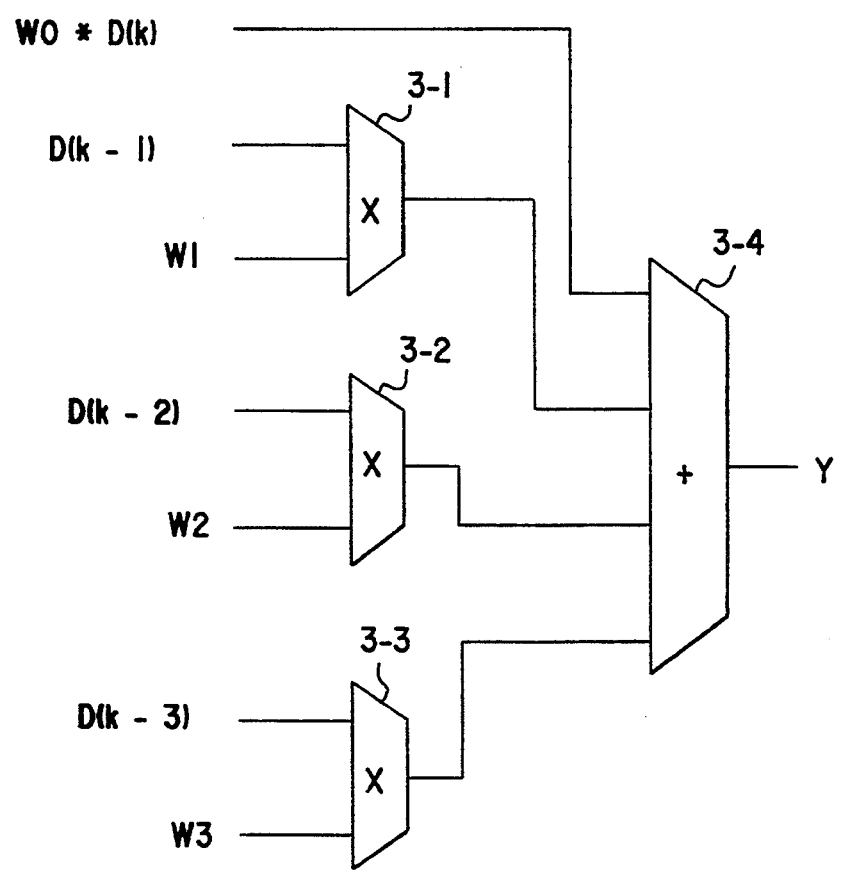
FIG. 19 is a block diagram showing the construction of a multiple-input arithmetic unit of a third concrete embodiment according to the present invention.
Figure 20:
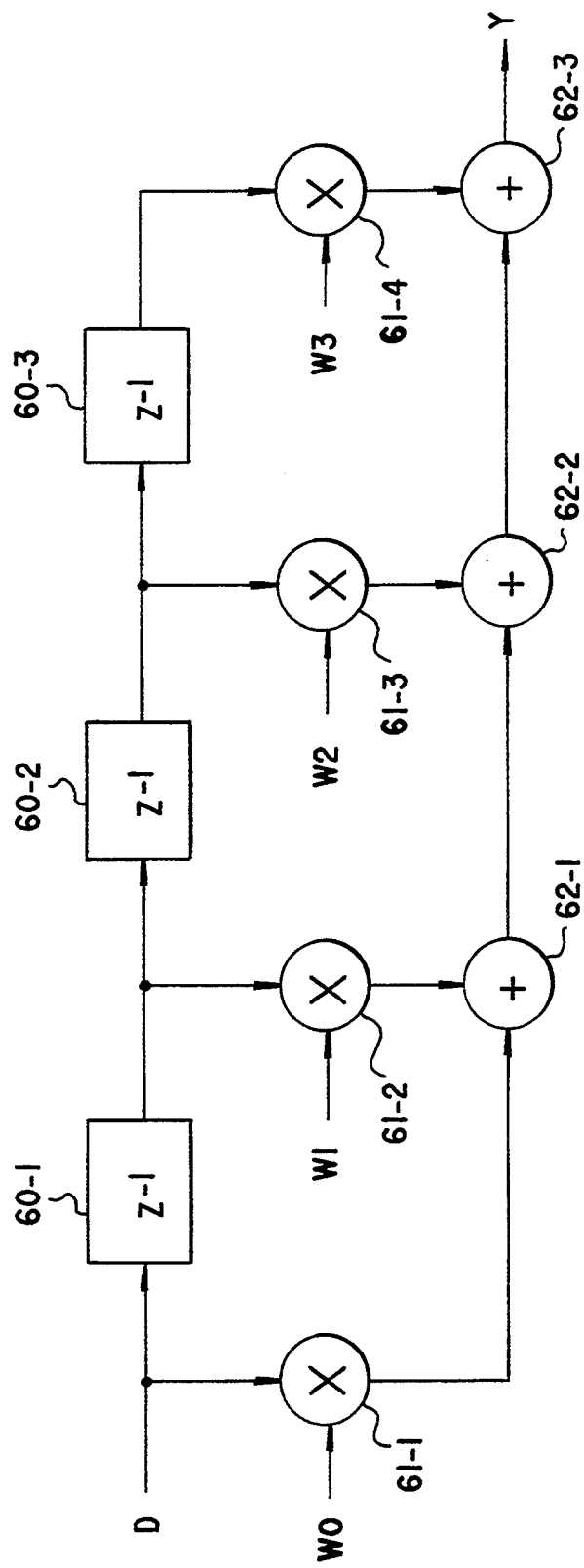
FIG. 20 is a diagram showing an example of a filter related to FIG. 19.

FIG. 19 is a block diagram showing the construction of a multiple-input arithmetic unit of a third concrete embodiment according to the present invention, and FIG. 20 is a diagram showing an example of a filter related to FIG. 19. Here, the case where a multiple-input arithmetic system according to the present invention is applied to a digital filter for processing digital signals, is illustrated. Further, it is assumed that arithmetic operations of $Y(k)=(W0+W1*Z^{-1}+W2*Z^{-2})D(k)$ are performed.

In FIG. 19, an arithmetic system of four-input type is constituted by combining a single floating-point addition and subtraction calculation device of four-input type 3-4, and a plurality of conventional multipliers 3-1, 3-2 and 3-3.

In FIG. 20, a two dimensional arrangement of a digital filter shown in FIG. 19 is illustrated more concretely. In this case, non-cyclic type FIR (Finite Impulse Response) is illustrated representatively. The digital filter in FIG. 20 is realized by four multiplying means 61-1, 61-2, 61-3 and 61-4, three delay units 60-1, 60-2 and 60-3, and a single floating-point addition and subtraction calculation device of four input type 62-1, 62-2 and 62-3.

Here, the floating-point addition and subtraction calculation device of four-input type is illustrated, divided into three portions, in order to clarify a flow of arithmetic process. However, the floating-point addition and subtraction calculation device should be actually constituted by a single LSI, together with the multiplying means, delay units and the like.

In general, by means of a digital filter, various digital signals are required to be processed in real time and at relatively high speed. Therefore, it is necessary for floating-point addition and subtraction calculations which are especially troublesome to be performed as rapidly as possible.

In the present invention, since such a floating-point addition and subtraction calculation device is constituted by only one device, the disadvantage can be avoided that the process for adjusting the respective digit positions of mantissas, the normalization process, and the like, are executed in such a manner that each process is often repeated among a plurality of arithmetic units and is dispersed among them. Therefore, it becomes possible for the arithmetic process by utilizing a digital filter to be performed at relatively high speed.

Figures 21, 23:
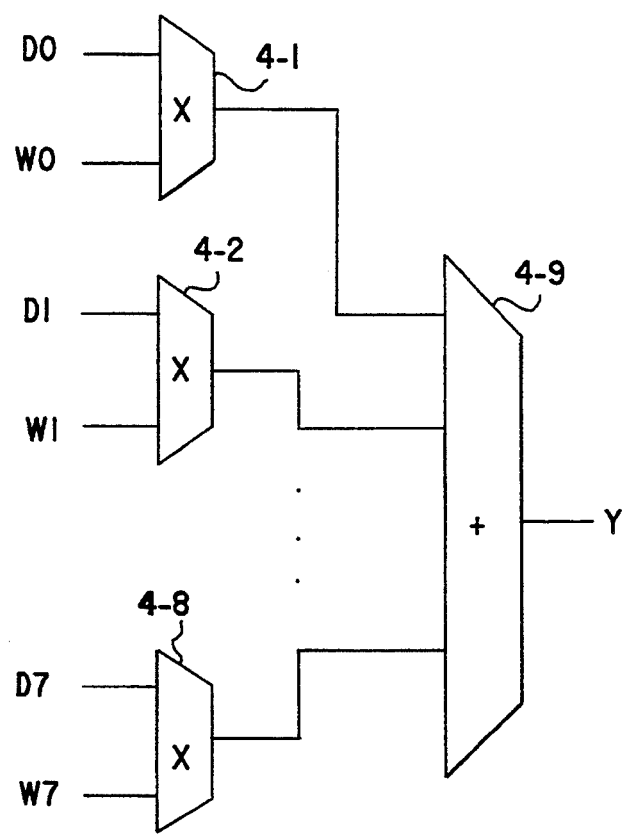
FIG. 21 is a block diagram showing the construction of a multiple-input arithmetic unit of a fourth concrete embodiment according to the present invention.
FIG. 23 is a diagram showing an example of the construction of pixel arrangement with respect to a spatial filter for image processing as shown in FIG. 22.
Figure 22:
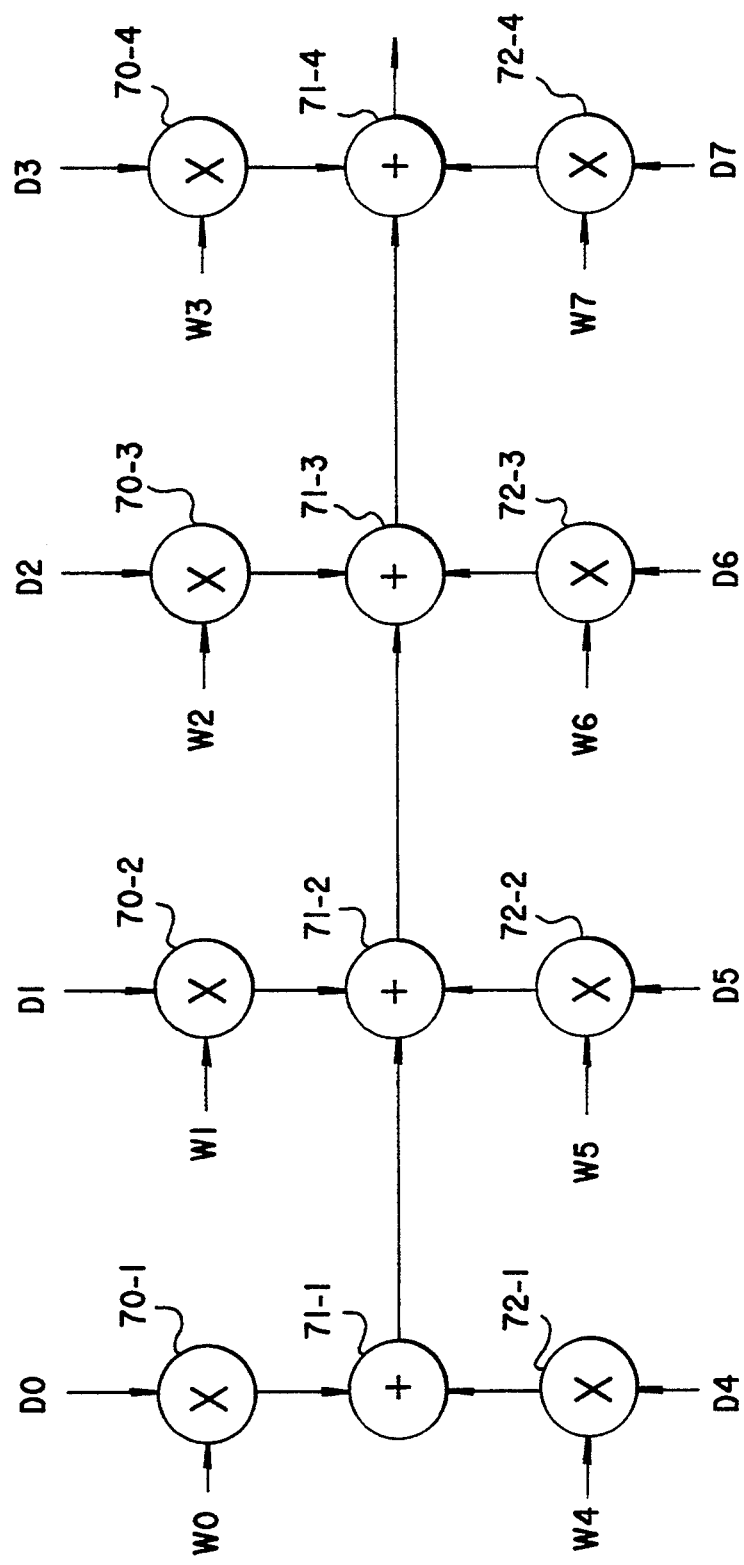
FIG. 22 is a diagram showing an example of a filter related to FIG. 21.

FIG. 21 is a block diagram showing the construction of a multiple-input arithmetic unit of a fourth concrete embodiment according to the present invention; FIG. 22 is a diagram showing an example of a filter related to FIG. 21; and FIG. 23 is a diagram showing an example of the construction of pixel arrangement with respect to a spatial filter for image processing as shown in FIG. 22.

Here, the case where a multiple-input arithmetic system according to the present invention is applied to a spatial filter for image processing, is illustrated. Further, it is assumed that arithmetic operations of $Y=W0*D0+W1*D1+W2*D2+W3*D3+W4*D4+W5*D5+W6*D6+W7*D7$.

In FIG. 21, an arithmetic system of eight input type is constituted by combining a single floating-point addition and subtraction calculation device of eight-input type 4-9, and a plurality of conventional multipliers 4-1 to 4-8.

In FIG. 22, a two dimensional arrangement of a spatial filter for image processing shown in FIG. 21 is illustrated more concretely. The spatial filter in FIG. 22 is realized by eight multiplying means 70-1 to 70-4 and 72-1 to 72-4, and a single floating-point addition and subtraction calculation device of eight-input type 71-1 to 71-4.

Here, the floating-point addition and subtraction calculation device of eight-input type is illustrated, divided into four portions, in order to clarify a flow of arithmetic process. However, the floating-point addition and subtraction calculation device should be actually constituted by a single LSI, together with the multiplying means and the like.

In FIG. 22, an example of a two dimensional arrangement of pixels constituting the respective point of a spatial filter for image processing, is illustrated. By virtue of such a two dimensional arrangement, an adequate weight is given to each pixel and a desired spatial filter can be realized.

In general, in designing a spatial filter for image processing, large amounts of input data and arithmetic operations at extremely high speed are required. Accordingly, arithmetic operations in the floating-point representation have been deemed to be difficult. However, the present invention takes advantage of the fact that the circuit of relatively large size can be realized, due to a remarkable increase in the number of logic gates which can be contained in a single LSI with an improvement of the integration technology, and enables multiple-input floating-point arithmetic system to be also applied to the field of a spatial filter for image process.

Figure 24:
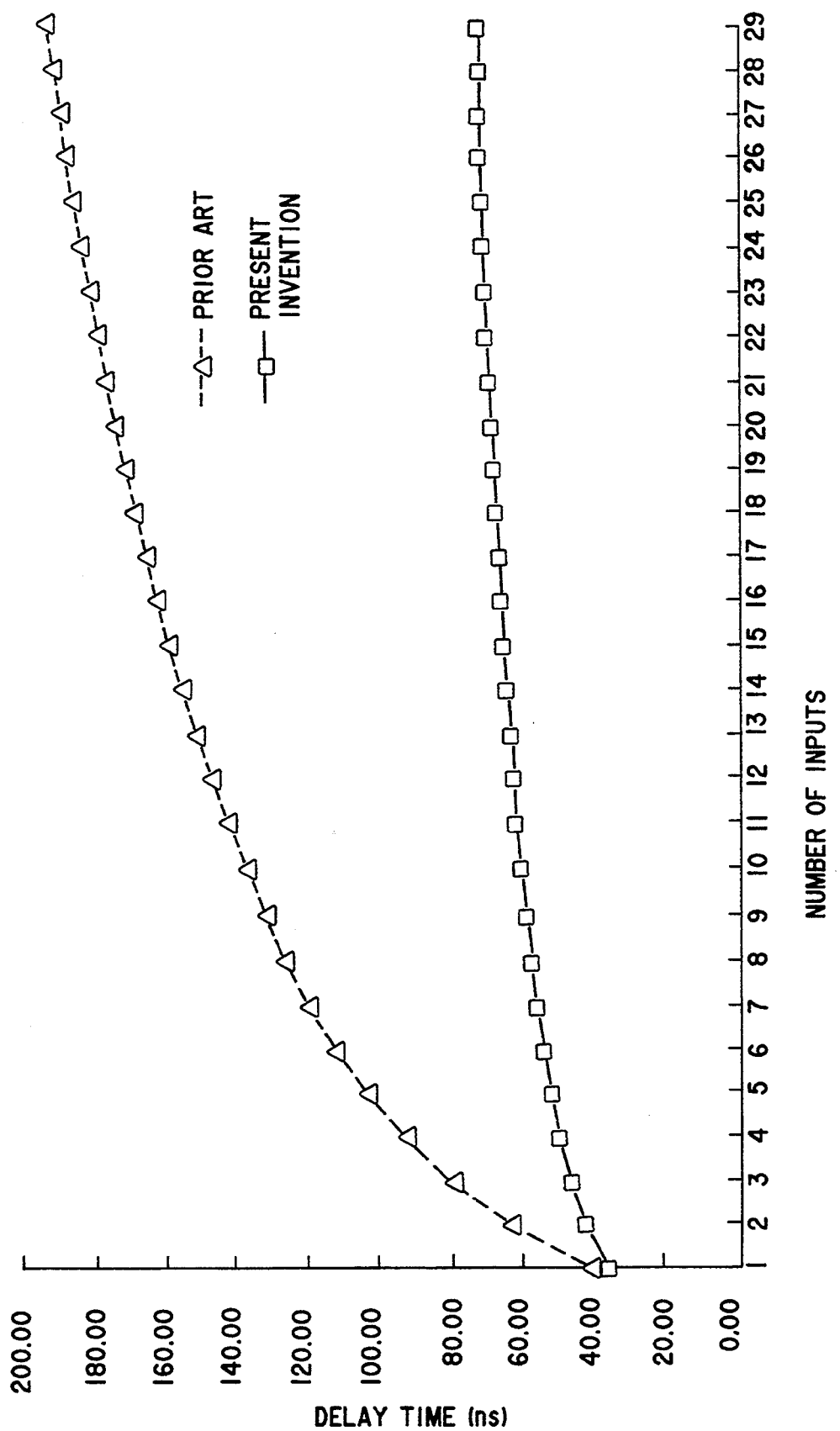
FIG. 24 is a graph showing a result of the comparison of delay time between an arithmetic system according to the present invention and an arithmetic system according to the prior art.
Figure 25:
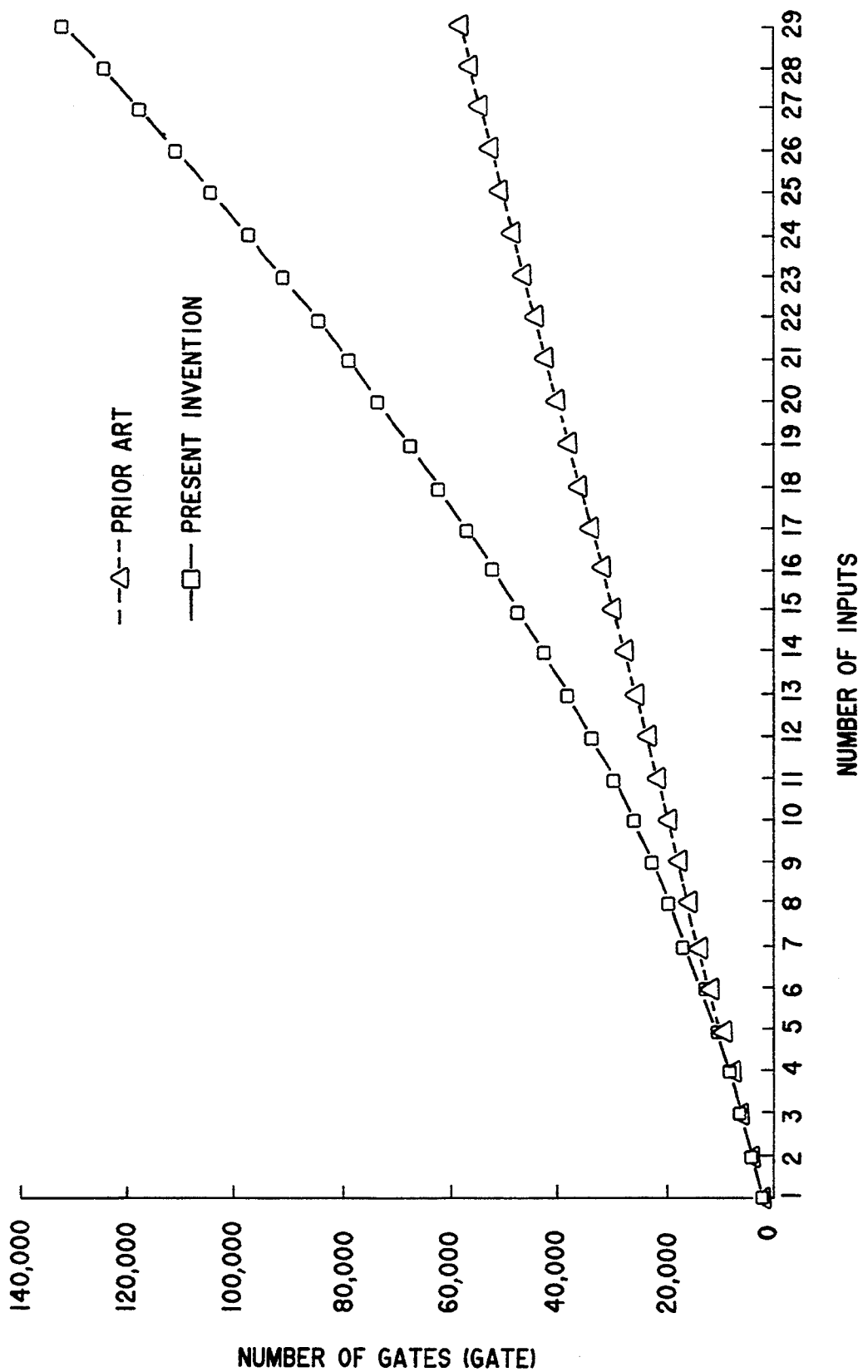
FIG. 25 is a graph showing a result of the comparison of the size of circuit between an arithmetic system according to the present invention and an arithmetic system according to the prior art.
Figure 26:
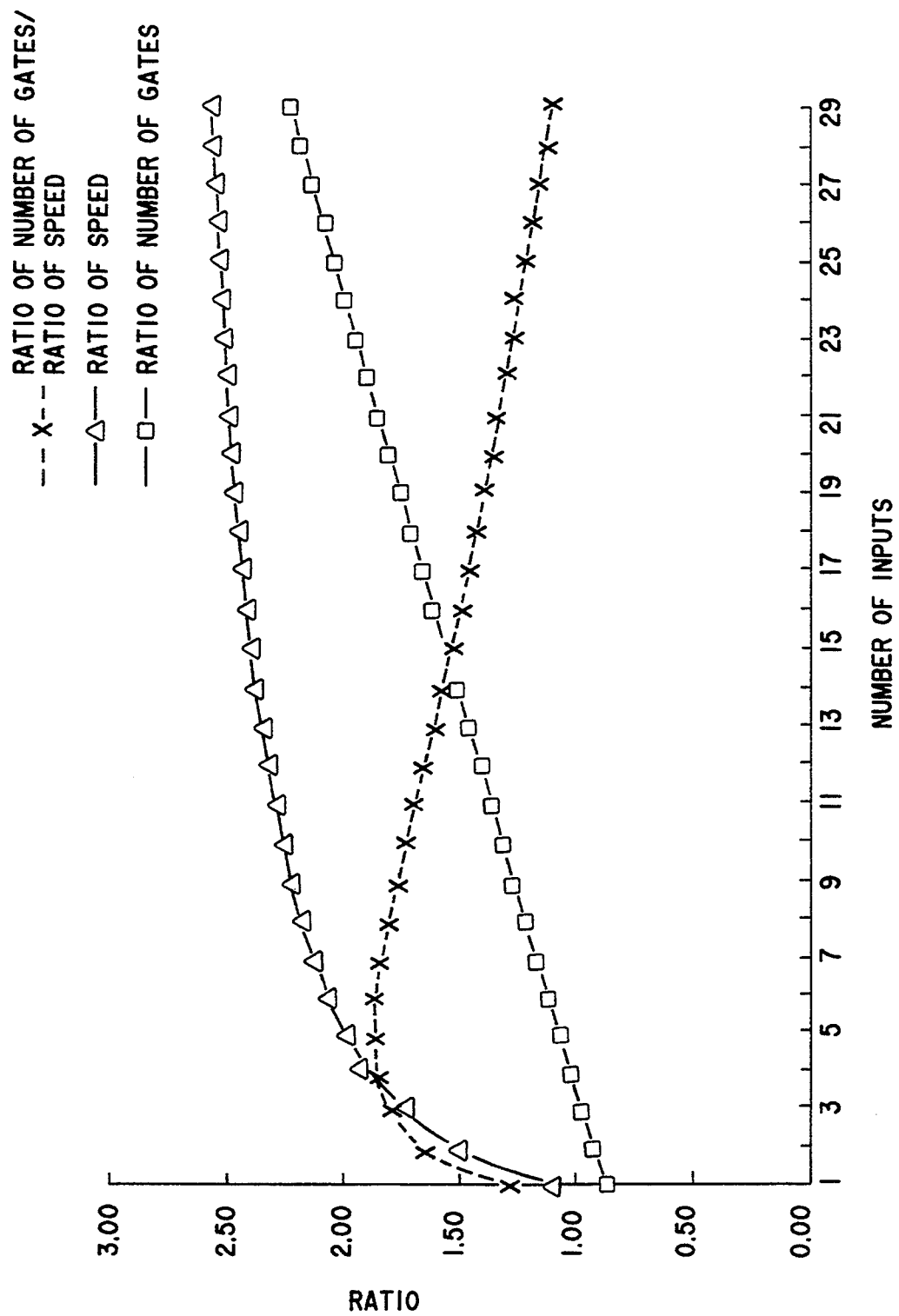
FIG. 26 is a graph showing a result of the comparison of a ratio of speed and a ratio of the number of logic gates between an arithmetic system according to the present invention and an arithmetic system according to the prior art.

FIG. 24 is a graph showing a result of the comparison of delay time between an arithmetic system according to the present invention and an arithmetic system according to the prior art; FIG. 25 is a graph showing a result of the comparison of the size of circuit between an arithmetic system according to the present invention and an arithmetic system according to the prior art; and FIG. 26 is a graph showing a result of the comparison of a ratio of speed and a ratio of the number of logic gates between an arithmetic system according to the present invention and an arithmetic system according to the prior art.

In FIG. 24, the graph indicates what the degree of delay time in the arithmetic systems according to the present invention and according to the prior art becomes, in the case where the same number of inputs is required.

As apparent from FIG. 24, a value of delay time in the arithmetic system including a multiple-input addition and subtraction calculation device of the present invention (shown in the solid line) becomes much smaller than that in the arithmetic system of the prior art (shown in the broken line) of an array type. Therefore, the arithmetic operations according to the present invention can be performed at very high speed.

In FIG. 25, the graph indicates how many logic gates can be integrated in the arithmetic systems according to the present invention and according to the prior art, in the case where the same number of inputs is required.

In other words, as the number of logic gates in FIG. 25 is increased, the necessary amount of hardware can be reduced and it is possible for the whole size of logic circuit to be made proportionally smaller.

As apparent from FIG. 25, the number of logic gates in the arithmetic system including a multiple-input addition and subtraction calculation device of the present invention (shown in the solid line) becomes much larger than that in the arithmetic system of the prior art (shown in the broken line). Therefore, the whole size of the logic circuit necessary for the arithmetic system of the present invention can be very small.

In FIG. 26, the ratio of speed between the arithmetic system according to the present invention and the arithmetic system according to the prior art, is illustrated by the thin solid line. To be more specific, the ratio of speed between the two arithmetic systems is defined by the ratio of operating frequency (the inverse of the delay time) between the two arithmetic systems, in the case where a value of operating frequency in the arithmetic system of the prior art is given to the denominator of the ratio, and where a value of operating frequency in the arithmetic system of the present invention is given to the numerator thereof.

Further, in FIG. 26, the ratio of the number of logic gates between the arithmetic system according to the present invention and the arithmetic system according to the prior art in the case where the same number of inputs is required, is illustrated by the bold solid line. To be more specific, the ratio of the number of logic gates between the two arithmetic systems is defined in such a manner that the number of logic gates of the prior art is given to the denominator of the ratio, and that the number of logic gates in the arithmetic system of the present invention is given to the numerator thereof.

Furthermore, in FIG. 26, the ratio of the number of logic gates to the speed, which represents the degree of cost performance in the arithmetic system of the present invention relative to that of the prior art, is illustrated by the broken line.

As apparent from FIG. 26, in the arithmetic system of the present invention, the operational speed (operational frequency) becomes higher than the case of the prior art. Further, the number of logic gates that can be integrated becomes larger than the case of the prior art.

More concretely, when the number of inputs is approximately 5 to 9, the ratio of the number of logic gates to the speed (the broken line) takes a maximum value that is approximately 1.7 to 1.8.

In the spatial filter for image processing as described before, the number of inputs is approximately 8 to 9, and therefore the performance in the arithmetic system of the present invention can be fully utilized.

As described above, according to the preferred embodiments of the present invention, multiple-input floating-point addition and subtraction means, which has a function of comparing the respective exponents of multiple-input floating-point data in parallel, can be provided, by taking advantage of the current technology of an LSI.

Since such a floating-point addition and subtraction means, e.g., a floating-point addition and subtraction calculation device of a multiple-input type, is constituted by only one device, the disadvantage can be avoided that the process for adjusting the digit positions and the normalization process are executed in such a manner that each process is often repeated among a plurality of arithmetic units and is dispersed among them. Namely, a problem that speed of arithmetic operations is likely to be decreased in an arithmetic system of the systolic array type, can be solved.

Further, the other disadvantage can be also avoided that a partial sum obtained as a result of jump addition in the boundary between adjoining stages is stored in each stage in a dispersed condition, and that a troublesome supplementary process in the last procedure of arithmetic operations has to be executed.

Consequently, in the preferred embodiments of the present invention, a floating-point arithmetic system, which enables addition and subtraction calculations for multiple floating-point data to be executed with relatively small amounts of hardware and at relatively high speed, can be realized.

Especially, in the case where $(n+1)$ kinds of floating-point data are input, the construction of the present invention can have the same performance as that of the prior art in which n kinds of two-input-type floating-point adder-subtractors are provided.

While the present invention has been described as related to the preferred embodiments such as the first to fourth embodiments, it will be understood that various changes and modifications may be made without departing from the spirit and the scope of the invention as hereinafter claimed.

We claim:

1. A floating-point arithmetic system, which allows arithmetic operations including at least addition and subtraction calculations to be performed with respect to floating-point data indicated in the floating-point representation by separating each of said floating-point data into an exponent and a mantissa, comprising:

multiple-input addition and subtraction means for executing addition and subtraction calculations of at least three floating-point data, said multiple-input addition and subtraction means, which enables at least three floating-point data to be input, including shift-amount determining means which compares the respective exponents of said floating-point data in parallel with each other, selects the maximum exponent from said exponents, and determines the amount of shift in the respective mantissas of said floating-point data, based on said maximum exponent, said shift amount determining means including a parallel comparator which compares the respective exponents of said floating-point data in parallel with each other, with respect to the magnitude of said exponents, a sequence-discrimination circuit which selects the maximum exponent in accordance with an output from said parallel comparator, and a parallel-exponent-subtraction circuit which calculates a difference between a value of said selected maximum exponent and a value of each of said exponents of said floating-point data, so as to determine the amount of shift in the respective mantissas of said floating-point data; said multiple-input addition and subtraction means also including mantissa shifting means which shifts the respective mantissas of said floating-point data in accordance with said determined amount of shift and makes an adjustment of digit positions of said mantissas;

at least one multiple-input adder-subtractor which executes addition and subtraction for said mantissas output from said mantissa shifting means; and a normalization circuit which normalizes a result of said addition and subtraction obtained by said multiple-input adder-subtractor.

2. A system as set forth in claim 1, wherein said parallel comparator includes:

a parallel comparison circuit which has a plurality of positive number comparators provided corresponding to the number of combinations among said floating-point data that are input to said multiple-input means, said positive number comparators comparing the respective exponents of said two different floating-point data with each other in regard to each of said combinations.

3. A system as set forth in claim 1, wherein said parallel comparator includes:

a parallel comparison circuit which has a plurality of positive number comparators provided corresponding to the number of combinations among said floating-point data that are input to said multiple-input means, said positive number comparators comparing the respective exponents of said two different floating-point data with each other in regard to each of said combinations, and wherein said sequence-discrimination circuit includes:

a look up table which outputs a select signal for selecting said maximum exponent in accordance with a result of comparison obtained by each of said positive number comparators.

4. A system as set forth in claim 1, wherein temporary storage means is provided in at least one of boundaries between said shift-amount determining means, said mantissa shifting means and said multiple-input adder-subtractor, and wherein the whole construction of said multiple-input addition and subtraction means takes a form of pipe-line.

5. A system as set forth in claim 1, wherein an accumulative addition and subtraction calculation device is constituted by utilizing said multiple-input addition and subtraction means.

6. A system as set forth in claim 1, wherein the system is realized by combining said multiple-input addition and subtraction means, and at least one multiplier.

7. A system as set forth in claim 1, wherein the system is realized by combining said multiple-input addition and subtraction means, and at least one divider.

8. A floating-point arithmetic system, which allows arithmetic operations including at least addition and subtraction calculations to be performed with respect to floating-point data indicated in the floating-point representation by separating each of said floating-point data into an exponent and a mantissa, comprising:

multiple-input addition and subtraction means for executing addition and subtraction calculations of at least three floating-point data, said multiple-input addition and subtraction means which enables at least three floating-point data to be input, including shift-amount determining means which compares the respective exponents of said floating-point data in parallel with each other, selects the maximum exponent from said exponents, and determines the amount of shift in the respective mantissas of said floating-point data, based on said maximum exponent, said shift-amount determining means including a parallel comparator which compares the respective exponents of said floating-point data in parallel with each other, with respect to the magnitude of said exponents, a sequence-discrimination circuit which selects the maximum exponent in accordance with an output from said parallel comparator, and a parallel-exponent-subtraction circuit which calculates a difference between a value of said selected maximum exponent and a value of each of said exponents of said floating-point data, so as to determine the amount of shift in the respective mantissas of said floating-point data, wherein said parallel comparator includes a parallel comparision circuit which has a plurality of positive number comparators provided corresponding to the number of combinations among said floating-point data that are input to said multiple-input means, said positive number comparators comparing the respective exponents of said two different floating-point data with each other in regard to each of said combinations, wherein said parallel comparator includes a look up table which outputs a select signal for selecting said maximum exponent in accordance with a result of comparison obtained by each of said positive number comparators; said multiple-input addition and subtraction means also including mantissa shifting means which shifts the respective mantissas of said floating-point data in accordance with said determined amount of shift and makes an adjustment of digit positions of said mantissas, said mantissa shifting means including either one stage of a multiplexer or plural stages of multiplexers which execute a shift operation by the length of a plurality of digits with respect to each of said mantissas of said floating-point data; at least one multiple-input adder-subtractor which executes addition and subtraction for said mantissas output from said mantissa shifting means; and a normalization circuit which normalizes a result of said addition and subtraction obtained by said multiple-input adder-subtractor.

9. A system as set forth in claim 8, wherein temporary storage means is provided in at least one of boundaries between said shift-amount determining means, said mantissa shifting means and said multiple-input adder-subtractor, and wherein the whole construction of said multiple-input addition and subtraction means takes a form of pipe-line.

10. A system as set forth in claim 8, wherein an accumulative addition and subtraction calculation device is constituted by utilizing said multiple-input addition and subtraction means.

11. A system as set forth in claim 8, wherein the system is realized by combining said multiple-input addition and subtraction means, and at least one multiplier.

12. A system as set forth in claim 8, wherein the system is realized by combining said multiple-input addition and subtraction means, and at least one divider.

* * * * *